US012679009B2

(12) United States Patent
Obata et al.

(10) Patent No.: US 12,679,009 B2
(45) Date of Patent: *Jul. 14, 2026

(54) THERMOSETTING COMPOSITION FOR INJECTION MOLDING, METHOD FOR PRODUCING MOLDED ARTICLE USING THE SAME, AND CURED PRODUCT

(71) Applicant: IDEMITSU KOSAN CO., LTD., Tokyo (JP)

(72) Inventors: Yutaka Obata, Tokyo (JP); Yasunari Okada, Tokyo (JP); Katsuki Ito, Tokyo (JP); Kazuki Watanabe, Tokyo (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 155 days.

This patent is subject to a terminal disclaimer.

(21) Appl. No.: 18/285,817

(22) PCT Filed: Apr. 6, 2022

(86) PCT No.: PCT/JP2022/017201

§ 371 (c)(1),
(2) Date: Oct. 5, 2023

(87) PCT Pub. No.: WO2022/215711

PCT Pub. Date: Oct. 13, 2022

(65) Prior Publication Data

US 2024/0208116 A1 Jun. 27, 2024

(30) Foreign Application Priority Data

Apr. 7, 2021 (JP) ................................ 2021-065540

(51) Int. Cl.
*B29C 45/00* (2006.01)
*B29C 45/02* (2006.01)
(Continued)

(52) U.S. Cl.
CPC .......... *B29C 45/0001* (2013.01); *B29C 45/02* (2013.01); *B29C 45/76* (2013.01);
(Continued)

(58) Field of Classification Search
CPC ........... B29C 45/0001; B29C 45/0053; B29C 45/0055; B29C 45/0062; B29C 45/02;
(Continued)

(56) References Cited

U.S. PATENT DOCUMENTS

2011/0287242 A1 11/2011 Kanagawa et al.
2016/0215084 A1 7/2016 Shimura et al.
(Continued)

FOREIGN PATENT DOCUMENTS

CN 105594308 A 5/2016
CN 112166135 A 1/2021
(Continued)

OTHER PUBLICATIONS

International Searching Authority, "International Search Report," issued in connection with International Patent Application No. PCT/JP2022/017201, dated Jul. 5, 2022.
(Continued)

*Primary Examiner* — Thu Khanh T. Nguyen
(74) *Attorney, Agent, or Firm* — Foley & Lardner LLP

(57) ABSTRACT

A thermosetting composition for injection molding comprising: (A) a di(meth)acrylate compound having structural units represented by the formulas (A1), and (B) a thermal polymerization initiator.

(A1)

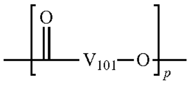

6 Claims, 2 Drawing Sheets

(51) Int. Cl.
*B29C 45/76* (2006.01)
*B29K 31/00* (2006.01)

(52) U.S. Cl.
CPC ............... *B29C 2945/76006* (2013.01); *B29C 2945/7604* (2013.01); *B29K 2031/00* (2013.01)

(58) Field of Classification Search
CPC ......... B29C 45/10; B29C 45/18; B29C 45/34; B29C 45/54; B29C 2045/0049; B29C 2045/0089
See application file for complete search history.

(56) References Cited

U.S. PATENT DOCUMENTS

| | | | | |
|---|---|---|---|---|
| 2017/0203476 | A1 * | 7/2017 | Obata ............... | B29C 45/14336 |
| 2021/0171683 | A1 | 6/2021 | Obata et al. | |

FOREIGN PATENT DOCUMENTS

| | | | |
|---|---|---|---|
| JP | H08-272208 | A | 10/1996 |
| JP | 2003-034709 | A | 2/2003 |
| JP | 2008-280414 | A | 11/2008 |
| JP | 2010-138248 | A | 6/2010 |
| JP | 2012-072328 | A | 4/2012 |
| JP | 2012-214640 | A | 11/2012 |
| JP | 2020-094208 | A | 6/2020 |
| JP | 2021-191820 | A | 12/2021 |
| WO | WO-2009/107301 | A1 | 9/2009 |
| WO | WO-2019/235465 | A1 | 12/2019 |
| WO | WO-2021/246154 | A1 | 12/2021 |

OTHER PUBLICATIONS

PCT International Preliminary Report on Patentability, dated Oct. 19, 2023, which includes a Translation of International Searching Authority, "Written Opinion," issued in connection with International Patent Application No. PCT/JP2022/017201, dated Jul. 5, 2022.
Office Action issued in corresponding Chinese Patent Application No. 202280026748.1 dated May 29, 2026.

* cited by examiner

THERMOSETTING COMPOSITION FOR INJECTION MOLDING, METHOD FOR PRODUCING MOLDED ARTICLE USING THE SAME, AND CURED PRODUCT

CROSS-REFERENCE TO RELATED APPLICATIONS

The present application claims priority under 35 U.S.C. § 371 to International Patent Application No. PCT/JP2022/017201, filed Apr. 6, 2022, which claims priority to and the benefit of Japanese Patent Application No. 2021-065540, filed on Apr. 7, 2021. The contents of these applications are hereby incorporated by reference in their entireties.

TECHNICAL FIELD

The invention relates to a thermosetting composition for injection molding, a method for producing a molded article using the same, and a cured product.

BACKGROUND ART

In recent years, densification and high integration of electric and electronic components have been advanced, and increase in the reliability of each component is required.

In order to increase the reliability of each component, for example, an attempt has been made to control external environmental influences such as physical factors such as vibration and dropping, chemical factors such as ultraviolet rays, moisture, and salinity, and the like, by sealing with a resin the entire printed circuit board on which a circuit is formed by soldering an electric and electronic component, or by sealing an electric component such as a coil with a resin.

A thermosetting material is used as a material to achieve this requirement. As the thermosetting resin, it has been proposed to use a polymer having a functional group of a silicone-based, a polyether-based, and an isocyanate-based, and urethane resin (see, for example, Patent Documents 1 to 4).

However, a disadvantage exists that productivity is very poor, and materials and production methods that can significantly improve productivity are desired.

RELATED ART DOCUMENTS

Patent Documents

[Patent Document 1] JP H08-272208 A
[Patent Document 2] JP 2008-280414 A
[Patent Document 3] WO 2009/107301 A1
[Patent Document 4] JP 2003-34709 A

SUMMARY OF THE INVENTION

An object of the invention is to provide a thermosetting composition for injection molding, which can form a cured product excellent in waterproofness, water vapor barrier property, and heat resistance, and which is excellent in productivity and moldability, a method for producing a molded article using the same, and a cured product.

The thermosetting resins of Patent Documents 1 to 4 described above are usually used in application with a spin coater or the like. The resins are also used for dipping. As other molding methods, molding using a potting device, applying and coating using various dispensers, and the like are known.

The inventors have arrived at the problem that, in the spin coating, a photolithography process is required when taking the wiring connection into consideration. The inventors also considered that spin coating could not be used for three-dimensional objects. The inventors also came up with the idea that the dipping may cause solvents and the like to erode the electrical circuits in the object.

As a result of intensive studies, the inventors have found the use of injection molding, and as a result of further studies, the inventors have completed the invention by combining specific components.

According to the invention, the following thermosetting composition for injection molding and so on are provided.

1. A thermosetting composition for injection molding comprising:

(A) a di(meth)acrylate compound having a structural unit represented by the following formula (A1), and (B) a thermal polymerization initiator:

(A1)

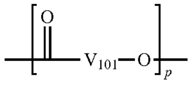

wherein in the formula (A1), $V_{101}$ is a substituted or unsubstituted divalent aromatic hydrocarbon group including 6 to 12 ring carbon atoms, a substituted or unsubstituted divalent alicyclic hydrocarbon group including 5 to 12 ring carbon atoms, or a substituted or unsubstituted divalent aliphatic hydrocarbon group including 2 to 30 carbon atoms;

p represents the average number of structural units; and when p is 2 or more, two or more $V_{101}$'s may be the same as or different from each other.

2. The thermosetting composition for injection molding according to 1, wherein the viscosity of the component (A) at a shear rate of 10 $s^{-1}$ at 25° C. measured in accordance with JIS K7117-2 is 0.001 Pa·s or larger and 80 Pa·s or smaller.

3. The thermosetting composition for injection molding according to 1 or 2, further comprising (C) one or more components selected from the group consisting of:

a compound represented by the following formula (C1), and a polymer comprising at least one structural unit represented by the following formula (C2) and at least one structural unit represented by the following formula (C3):

(C1)

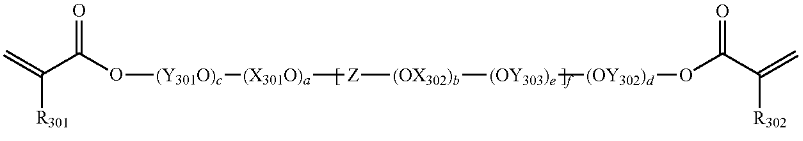

wherein in the formula (C1), $Y_{301}$, $Y_{302}$, and $Y_{303}$ independently represent a hydroxy group-substituted alkylene group including 1 to 10 carbon atoms, or an alkylene group including 1 to 10 carbon atoms;

$X_{301}$ and $X_{302}$ independently represent a hydroxy group-substituted alkylene group including 1 to 10 carbon atoms, or an alkylene group including 1 to 10 carbon atoms;

Z represents $—Z_{301}—Z_{302}—Z_{303}—$, or $—Z_{304}—Z_{305}—Z_{306}—$;

$R_{301}$ and $R_{302}$ independently represent a hydrogen atom or a methyl group;

$Z_{301}$ and $Z_{303}$ independently represent a substituted or unsubstituted divalent aromatic hydrocarbon group including 6 to 12 ring carbon atoms, or a substituted or unsubstituted divalent alicyclic hydrocarbon group including 6 to 12 ring carbon atoms;

$Z_{302}$ represents $—C(CH_3)_2—$, $—C(CF_3)_2—$, $—CH_2—$, $—S(=O)_2$, $—O—$, or $—C(=O)—$;

$Z_{304}$ and $Z_{306}$ independently represents a divalent organic group;

$Z_{305}$ represents a substituted or unsubstituted divalent fluorene, or a substituted or unsubstituted divalent naphthalene;

a and b independently represent an integer of 0 to 10; c, d, and e independently represent 0 or 1; f represents an integer of 1 to 5; and provided that a+(b×f)+c+d+(e×f) is 2 or more;

(C2)

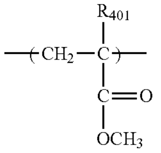

(C3)

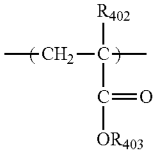

wherein in the formula (C2), $R_{401}$ is a hydrogen atom or a methyl group;

wherein in the formula (C3), $R_{402}$ is a hydrogen atom or a methyl group;

$R_{403}$ is an alkyl group including 2 to 18 carbon atoms, $—R_{411}OR_{412}$, or $—R_{413}SR_{414}$;

$R_{411}$ and $R_{413}$ are independently an alkylene group including 1 to 30 carbon atoms; and $R_{412}$ and $R_{414}$ are independently an alkyl group including 1 to 30 carbon atoms.

4. The thermosetting composition for injection molding according to 3, wherein the component (C) comprises the polymer containing at least one structural unit represented by the formula (C2) and at least one structural unit represented by the formula (C3).

5. The thermosetting composition for injection molding according to 4, wherein the polymer comprising at least one structural unit represented by the formula (C2) and at least one structural unit represented by the formula (C3) is a block copolymer.

6. The thermosetting composition for injection molding according to 3, wherein the component (C) comprises the compound represented by the formula (C1).

7. The thermosetting composition for injection molding according to any one of 3 to 6, wherein the content of the component (C) is 5% by mass or more and 50% by mass or less based on a total of 100% by mass of the components other than the component (B).

8. The thermosetting composition for injection molding according to any one of 1 to 7, further comprising (D) a compound represented by the following formula (D1):

(D1)

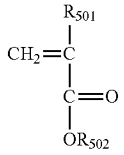

wherein in the formula (D1), $R_{501}$ is a hydrogen atom or a methyl group;

$R_{502}$ is a substituted or unsubstituted aliphatic hydrocarbon group including 1 to 30 carbon atoms; and provided that a di(meth)acrylate compound having the structural unit represented by the formula (A1) is excluded.

9. The thermosetting composition for injection molding according to any one of 1 to 8, having a viscosity at a shear rate of 10 $s^{-1}$ at 25° C. measured in accordance with JIS K7117-2 of 0.001 Pa·s or higher and 600 Pa·s or lower.

10. A method for producing a molded article comprising steps of:

supplying the thermosetting composition for injection molding according to any one of 1 to 9 into a plunger, filling the supplied thermosetting composition for injection molding into a cavity of a mold using the plunger, the cavity being set to be a gauge pressure of −90 kPa or lower (vacuum pressure 10 kPa) and an oxygen amount of 0.2×cavity volume/22.4 mol or smaller, or to be a gauge pressure of −90 kPa or lower (vacuum pressure 10 kPa) and an oxygen amount of 0.2×cavity volume/22.4 mol or smaller, and thermosetting the filed thermosetting composition for injection molding in the cavity.

11. The method for producing a molded article according to 10, wherein the temperature of a part of the mold constituting the cavity is 40 to 150° C.

12. The method for producing a molded article according to 10 or 11, wherein the filling is performed through a flow path between the plunger and the cavity, the flow path being controlled in a temperature at 50° C. or lower.

13. The method for producing a molded article according to 12, wherein the flow path has a gate system that blocks flow of the thermosetting composition for injection molding and heat transfer.

14. The method for producing a molded article according to 13, wherein the filling is performed by opening a gate of the gate system, and in the step of thermosetting, a pressure holding is performed, and after the pressure holding, the gate of the gate system is closed to complete the thermosetting.

15. The method for producing a molded article according to any one of 10 to 14, wherein the step of filling and the step of thermosetting are performed in 0.2 to 3 minutes.

16. A cured product produced using the thermosetting composition for injection molding according to any one of 1 to 9.

17. The cured product according to 16, which is a molded article.

According to the invention, a thermosetting composition for injection molding, which can form a cured product excellent in waterproofness, water vapor barrier property, and heat resistance, and which is excellent in productivity and moldability, a method for producing a molded article using the same, and a cured product can be provided.

MODE FOR CARRYING OUT THE INVENTION

Figure 1:
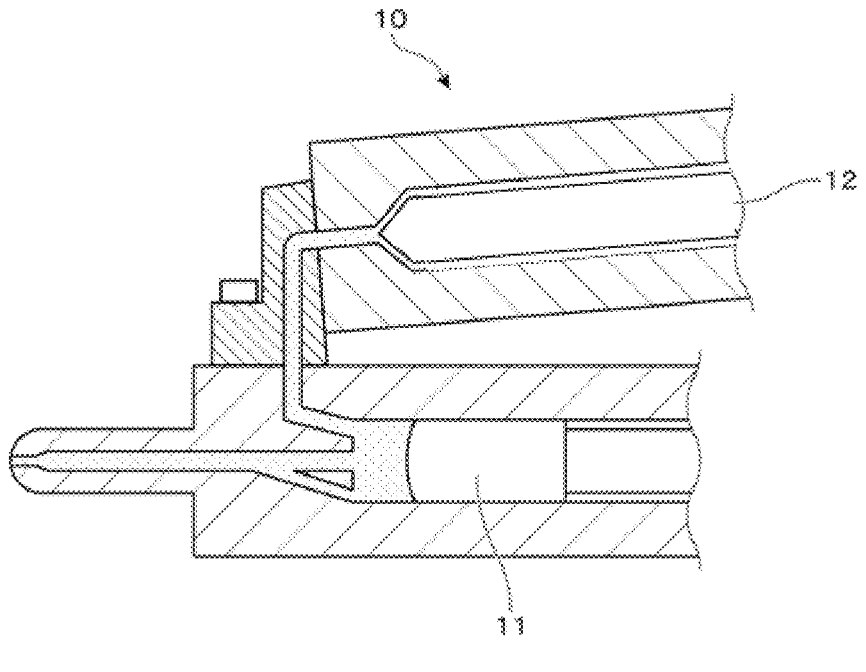
FIG. 1 is a schematic cross-sectional view of a filling device of a molding machine that can be used in the method for producing a molded article of the invention.

In this specification, "XX to YY carbon atoms" in the expression "a substituted or unsubstituted ZZ group including XX to YY carbon atoms" represents the number of carbon atoms when the ZZ group is unsubstituted, and does not include the number of carbon atoms of the substituent when the ZZ group is substituted. Here, "YY" is larger than "XX", and "XX" and "YY" independently mean an integer of 1 or more.

In this specification, "XX to YY atoms" in the expression "a substituted or unsubstituted ZZ group including XX to YY atoms" represents the number of atoms when the ZZ group is unsubstituted, and does not include the number of atoms of the substituent when the ZZ group is substituted. Here, "YY" is larger than "XX", and "XX" and "YY" independently mean an integer of 1 or more.

In this specification, examples of substituents in the context of "substituted or unsubstituted" (hereinafter, also referred to as an arbitrary substituent) include an alkyl group including 1 to 6 carbon atoms, an alkoxy group including 1 to 6 carbon atoms, a halogen atom, a hydroxy group, an oxirane group, a methacryloyloxy group, an acryloyloxy group, $—O(R_{901})$, $—S—(R_{902})$, $—N(R_{903})(R_{904})$, and the like. $R_{901}$ to $R_{904}$ are independently a hydrogen atom, or an alkyl group including 1 to 6 carbon atoms.

Examples of the alkyl group including 1 to 6 carbon atoms (preferably linear or branched) include a methyl group, an ethyl group, a propyl group (for example, a n-propyl group, and an isopropyl group), a butyl group (for example, a n-butyl group, an isobutyl group, a s-butyl group, and a t-butyl group), a pentyl group (for example, a n-pentyl group), a hexyl group, and the like.

Examples of the alkoxy group including 1 to 6 carbon atoms include a methoxy group, an ethoxy group, a propoxy group, a butoxy group, a pentyloxy group, a hexyloxy group, and the like.

Examples of the halogen atom include a fluorine atom, a bromine atom, an iodine atom, and the like.

The term "unsubstituted" in the context of "substituted or unsubstituted" means that the substituent is not substituted and a hydrogen atom is bonded.

In this specification, acrylate and methacrylate are collectively referred to as (meth)acrylate. Acrylic acid and methacrylic acid are collectively referred to as a (meth) acrylic acid. Acrylo and methacrylo are collectively referred to as (meth)acrylo. Acryl and methacryl are collectively referred to as (meth)acryl. A methacryloyl group and an acryloyl group are collectively referred to as a (meth) acryloyl group.

In this specification, the upper and lower limits stated for the numerical value range can be combined arbitrarily.

Among the individual embodiments of the aspects according to the invention, it is possible to combine two or more embodiments that do not conflict with each other, and an embodiment combining two or more embodiments is also an embodiment of the aspects according to the invention.

[Thermosetting Composition for Injection Molding]

The thermosetting composition for injection molding of the invention contains the following components (A) and (B):

(A) a di(meth)acrylate compound having a structural unit represented by the following formula (A1), and (B) a thermal polymerization initiator.

(A1)

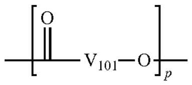

wherein in the formula (A1), $V_{101}$ is a substituted or unsubstituted divalent aromatic hydrocarbon group including 6 to 12 (preferably 6 to 10) ring carbon atoms, a substituted or unsubstituted divalent alicyclic hydrocarbon group including 5 to 12 (preferably 5 to 10) ring carbon atoms, or a substituted or unsubstituted divalent aliphatic hydrocarbon group including 2 to 30 (preferably 2 to 10, more preferably 2 to 6) carbon atoms;

p represents the average number of structural units, and is preferably in the range of 2 to 20, more preferably in the range of 2 to 10, and still more preferably in the range of 2 to 6; and when p is 2 or more, two or more $V_{101}$'s may be the same as or different from each other.

The composition provides excellent productivity and moldability (e.g., shorter curing time).

By the use of the composition, a cured product excellent in waterproofness (sealing property), water vapor barrier property, and heat resistance can be formed.

The good moldability means, for example, that filling property is good, that burrs and warpage in a molded article are not likely to occur, that curing defects do not likely occur, that releasing property is good, and that a molded article can be obtained even without requiring a special technique.

The good productivity means, for example, that a molded article can be obtained in a short time, that mold contamination can be suppressed, that molding can be continued in succession, and that a molding cycle from filling into an electronic component and an electric circuit to curing can be shortened.

The good waterproofness (sealing property) means barrier properties against moisture, oil, and the like with respect to an electrical component, an electronic component, and an electrical circuit. In addition, it means that an electrical component, an electronic component, and an electrical circuit are protected from foreign metal objects.

The thermosetting composition for injection molding of the invention preferably has the viscosity at a shear rate of 10 $s^{-1}$ at 25° C., measured in accordance with JIS K7117-2 of 0.001 Pads or larger and 600 Pa·s or smaller, more preferably 0.005 Pa·s or larger and 550 Pa·s or smaller.

The measurement of the viscosity in accordance with JIS K7117-2 (measurement at constant shear rate by a rotational viscometer) is performed using a viscoelasticity measuring apparatus.

In one embodiment, the thermosetting composition for injection molding of the invention does not contain a polybutadiene di(meth)acrylate having a structural unit represented by the following formula (1A) and a structural unit represented by the following formula (1B).

(1 A)

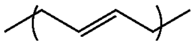

(1 B)

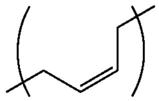

(Component (A))

The thermosetting composition for injection molding of the invention contains, as a component (A), a di(meth) acrylate compound having a structural unit represented by the formula (A1).

The component (A) has an ester bond moiety or a cross-linked structure, and provides a polymer having excellent flexibility, so that waterproofness, water vapor barrier properties, and heat resistance of an obtained cured product can be increased.

From the viewpoint of applicability to injection molding, the components (A) preferably have the viscosity at a shear rate of 10 $s^{-1}$ at 25° C. measured in accordance with JIS K7117-2 of 0.001 Pa·s or larger and 80 Pas or smaller, more preferably 0.002 Pa·s or larger and 40 Pa·s or smaller, still more preferably 0.005 Pa·s or larger and 20 Pa·s or smaller, and still more preferably 0.05 Pa·s or larger and 10 Pa·s or smaller.

The component (A) can be obtained, for example, by esterifying a hydroxy group of a polyester oligomer having hydroxy groups at both ends obtained by condensation of a polyvalent carboxylic acid and a polyhydric alcohol, with (meth)acrylic acid, or by esterifying hydroxy groups at both ends of an oligomer obtained by adding an alkylene oxide to a polyvalent carboxylic acid, with (meth)acrylic acid.

The di(meth)acrylate compound having a structural unit represented by the formula (A1) is preferably a compound represented by the following formula (A1-1).

(A1-1)

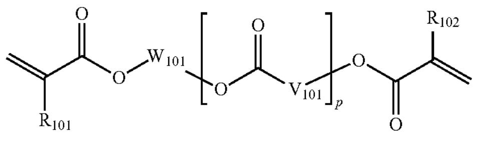

In the formula (A1-1), $V_{101}$ is a substituted or unsubstituted divalent aromatic hydrocarbon group including 6 to 12 (preferably 6 to 10) ring carbon atoms, a substituted or unsubstituted divalent alicyclic hydrocarbon group including 5 to 12 (preferably 5 to 10) ring carbon atoms, or a substituted or unsubstituted divalent aliphatic hydrocarbon group including 2 to 30 (preferably 2 to 10, more preferably 2 to 6) carbon atoms.

$W_{101}$ is a substituted or unsubstituted (preferably linear or branched) divalent aliphatic hydrocarbon group including 2 to 12 (preferably 2 to 10) carbon atoms ($W_{101}$ is preferably an unsubstituted divalent aliphatic hydrocarbon group including 2 to 12 carbon atoms).

$R_{101}$ and $R_{102}$ independently represent a hydrogen atom or a methyl group.

p represents the average number of structural units, and is preferably in the range of 2 to 20, more preferably in the range of 2 to 10, and still more preferably in the range of 2 to 6.

The p structures in the square brackets may be the same as or different from each other.

When two or more $V_{101}$'s are present, the two or more $V_{101}$'s may be the same as or different from each other.

Examples of the component (A) include commercially available products such as CN2203, CN2270, CN2271, CN2272, CN2273, CN2274, and CN2283 (manufactured by Arkema S.A.), and the like.

The component (A) may be used alone or in combination of two or more.

(Component (B))

The thermosetting composition for injection molding of the invention contains, as the component (B), a thermal polymerization initiator. The thermal polymerization initiator refers to a compound that generates active species such as radicals and cations by heating. By containing the component (B) thermal polymerization initiator, a stable molded article can be obtained (for example, the curing time can be shortened and the margin of the curing time can be narrowed).

The component (B) is not particularly limited, and examples thereof include a radical polymerization initiator.

Examples of the radical polymerization initiator are not particularly limited, and include ketone peroxides, hydroperoxides, diacyl peroxides, dialkyl peroxides, peroxyketals, alkyl peresters (peroxyesters), peroxycarbonates, and the like.

Specific examples of the ketone peroxides include methyl ethyl ketone peroxide, methyl isobutyl ketone peroxide, acetylacetone peroxide, cyclohexanone peroxide, methylcyclohexanone peroxide, and the like.

Specific examples of the hydroperoxides include 1,1,3,3-tetramethylbutyl hydroperoxide, cumene hydroperoxide, t-butyl hydroperoxide, p-menthane hydroperoxide, diisopropylbenzene hydroperoxide, and the like.

Specific examples of the diacyl peroxides include diisobutyryl peroxide, bis-3,5,5-trimethylhexanol peroxide, dilauroyl peroxide, dibenzoyl peroxide, m-tolyl benzoyl peroxide, succinic acid peroxide, and the like.

Specific examples of the dialkyl peroxides include dicumyl peroxide, 2,5-dimethyl-2,5-di(t-butylperoxy)

hexane, 1,3-bis(t-butylperoxyisopropyl)hexane, t-butylcumyl peroxide, di-t-butyl peroxide, di-t-hexyl peroxide, 2,5-dimethyl-2,5-di(t-butylperoxy)hexyne-3, and the like.

Specific examples of the peroxyketals include 1,1-di-t-hexylperoxy-3,3,5-trimethylcyclohexane, 1,1-di-t-hexylperoxycyclohexane, 1,1-di-t-butylperoxy-2-methylcyclohexane, 1,1-di-t-butylperoxycyclohexane, 2,2-di(t-butylperoxy)butane, butyl 4,4-bis t-butylperoxypentanoate, and the like.

Specific examples of the alkyl peresters (peroxy esters) include 1,1,3,3-tetramethylbutylperoxyneodecanoate, α-cumylperoxyneodecanoate, t-butylperoxyneodecanoate, t-hexylperoxyneodecanoate, t-butylperoxyneoheptanoate, t-hexylperoxypivalate, t-butylperoxypivalate, 1,1,3,3-tetramethylbutylperoxy-2-ethylhexanoate, t-amylperoxy-2-ethylhexanoate, t-butylperoxy-2-ethylhexanoate, t-butylperoxyisobutyrate, di-t-butylperoxyhexahydroterephthalate, 1,1,3,3-tetramethylbutylperoxy-3,5,5-trimethylhexanate, t-amylperoxy-3,5,5-trimethylhexanoate, t-butylperoxy-3,5,5-trimethylhexanoate, t-butylperoxyacetate, t-butylperoxybenzoate, dibutylperoxytrimethyladipate, 2,5-dimethyl-2,5-di-2-ethylhexanoylperoxyhexane, t-hexylperoxy-2-ethylhexanoate, t-hexylperoxyisopropyl monocarbonate, t-butylperoxylaurate, t-butylperoxyisopropyl monocarbonate, t-butylperoxy-2-ethylhexyl monocarbonate, 2,5-dimethyl-2,5-di-benzoylperoxyhexane, and the like.

Specific examples of the peroxycarbonate include di-n-propyl peroxydioxycarbonate, diisopropyl peroxycarbonate, di-4-t-butylcyclohexylperoxycarbonate, di-2-ethylhexylperoxycarbonate, di-sec-butylperoxycarbonate, di-3-methoxyperoxydicarbonate, di-2-ethylhexylperoxydicarbonate, diisopropyl oxydicarbonate, t-amyl peroxyisopropyl carbonate, t-butylperoxyisopropyl carbonate, t-butylperoxy-2-ethylhexyl carbonate, 1,6-bis(t-butylperoxycarboxyloxy)hexane, and the like.

As the component (B), from the viewpoint of heat resistance of the insert material, a thermal polymerization initiator having 1 hour half-life temperature of 30 to 130° C. is preferable.

Specifically, among the above compounds, diacyl peroxides, peroxycarbonates, peroxyesters, and peroxyketals are preferable.

More preferably, from the viewpoint of moldability, compounds represented by the following formulas B1 to B4 are used.

B1

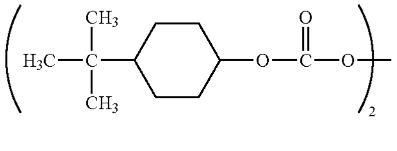

-continued

B2

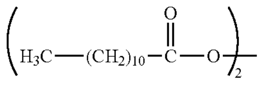

B3

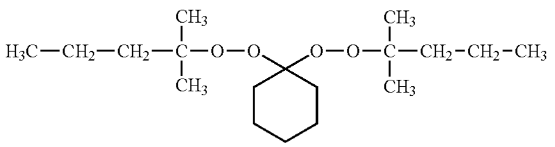

B4

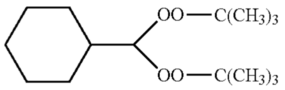

The component (B) may be used alone or in combination of two or more.

The content of the component (B) is preferably 0.01 to 10 parts by mass, more preferably 0.1 to 5 parts by mass, and still more preferably 0.1 to 3 parts by mass based on a total of 100 parts by mass of the components other than the component (B) (when a component (E), a component (F), and an additive described later are contained, components excluding the component (B), the component (E), the component (F), and the additive) (that is, based on 100 parts by mass of the component (A) (when the component (C) described later is contained, based on a total of 100 parts by mass of the component (A) and the component (C); when the component (D) described later is contained, based on a total of 100 parts by mass of the component (A) and the component (D); when the component (C) and the component (D) described later are contained, based on a total of 100 parts by mass of the component (A) and the component (C) and the component (D))).

When the content of the component (B) is within the above range, the molding time can be shortened and a molded article in which an uncured portion is reduced can be obtained.

(Component (C))

The thermosetting composition for injection molding of the invention preferably further contains, as a component (C), one or more selected from the group consisting of a compound represented by the following formula (C1) and a polymer containing one or more structural units represented by the following formula (C2) and one or more structural units represented by the following formula (C3), from the viewpoint of suppressing liquid leakage from a mold at the time of filling during the production of a molded article.

(C1)

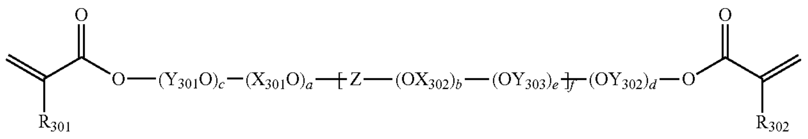

In the formula (C1), $Y_{301}$, $Y_{302}$, and $Y_{303}$ independently represent a hydroxy group-substituted alkylene group including 1 to 10 (preferably 1 to 4, more preferably 3) carbon atoms, or an alkylene group including 1 to 10 (preferably 1 to 4) carbon atoms.

$X_{301}$ and $X_{302}$ independently represent an alkylene group including 1 to 10 (preferably 1 to 4, more preferably 2 or 3) carbon atoms, or a hydroxy group-substituted alkylene group including 1 to 10 (preferably 1 to 4) carbon atoms.

Z represents $-Z_{301}-Z_{302}-Z_{303}-$, or $-Z_{304}-Z_{305}-Z_{306}-$.

$R_{301}$ and $R_{302}$ independently represent a hydrogen atom or a methyl group.

$Z_{301}$ and $Z_{303}$ independently represent a substituted or unsubstituted divalent aromatic hydrocarbon group including 6 to 12 (preferably 6 to 10) ring carbon atoms, or a substituted or unsubstituted divalent alicyclic hydrocarbon group including 6 to 12 (preferably 6 to 10) ring carbon atoms.

$Z_{302}$ represents $-C(CH_3)_2-$, $-C(CF_3)_2-$, $-CH_2-$, $-S(=O)_2-$, $-O-$, or $-C(=O)-$.

$Z_{304}$ and $Z_{306}$ independently represents a divalent organic group.

$Z_{305}$ represents a substituted or unsubstituted divalent fluorene (fluorenediyl group) or a substituted or unsubstituted divalent naphthalene (naphthalenediyl group or naphthylene group).

a and b independently represent an integer of 0 to 10 (preferably 0, 1, or 2). c, d, and e independently represent 0 or 1. f represents an integer of 1 to 10 (preferably 1 to 5, more preferably 1 to 3).

a+(b×f)+c+d+(e×f) is 2 or more (preferably 2 to 18, more preferably 2 to 12).

(C2)

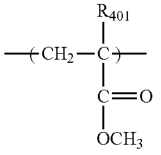

(C3)

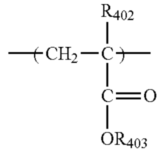

In the formula (C2), $R_{401}$ is a hydrogen atom or a methyl group.

In the formula (C3), $R_{402}$ is a hydrogen atom or a methyl group.

$R_{403}$ is an alkyl group including 2 to 18 (preferably 2 to 12) carbon atoms, $-R_{411}OR_{412}$, or $-R_{413}SR_{414}$.

$R_{411}$ and $R_{413}$ are independently an alkylene group including 1 to 30 (preferably 2 to 18) carbon atoms.

$R_{412}$ and $R_{414}$ are independently an alkyl group including 1 to 30 (preferably 2 to 18) carbon atoms.

By containing the component (C), the filling property can be increased. In addition, occurrence of burrs can be suppressed and a cured product having excellent heat resistance can be obtained.

Further, as an arbitrary effect, the continuous moldability can be increased, and the storage stability at room temperature can be increased.

In the formula (C1), examples of the divalent alkylene group including 1 to 10 carbon atoms of the divalent organic group for $Y_{301}$, $Y_{302}$, $Y_{303}$, $X_{301}$, $X_{302}$, $Z_{304}$, $Z_{306}$, and later described $Z_{307}$ include a methylene group, an ethylene group, a trimethylene group, a propylene group (for example, a 1,2-propylene group), a tetramethylene group, a butylene group, a 2-methyltrimethylene group, a pentylene group, a hexylene group, a heptylene group, an octylene group, a nonylene group, a decylene group, and the like.

Examples of the hydrogen group-substituted alkylene group including 1 to 10 carbon atoms (substituted with, for example, one or more, preferably one or two hydroxy groups) for $Y_{301}$, $Y_{302}$, $Y_{303}$, $X_{301}$, and $X_{302}$ include divalent groups in which a hydrogen atom of the above-mentioned alkylene group including 1 to 10 carbon atoms is substituted with a hydroxy group. Preferred are groups represented by the following formulas.

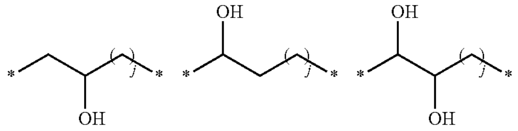

In the formulas, * represents a bonding site, and j represents an integer of 0 to 8 (preferably 0 to 3).

Examples of the divalent aromatic hydrocarbon group including 6 to 12 ring carbon atoms for $Z_{301}$ and $Z_{303}$ include a phenylene group, a biphenyldiyl group, and the like.

Examples of the divalent alicyclic hydrocarbon group including 6 to 12 ring carbon atoms for $Z_{301}$ and $Z_{303}$ include a cyclohexylene group, a cycloheptylene group, a cyclooctylene group, a cyclononylene group, a cyclodecylene group, a cycloundecylene group, a cyclododecylene group, and the like.

Examples of the divalent organic group for $Z_{304}$ and $Z_{306}$ include a divalent aliphatic hydrocarbon group (for example, including 1 to 10 carbon atoms), a divalent aromatic hydrocarbon group (for example, including 1 to 12 carbon atoms), $-(Z_{307}O)-$, and the like.

$Z_{307}$ is an alkylene group including 1 to 10 (preferably 1 to 4) carbon atoms.

Examples of the divalent aliphatic hydrocarbon group of the divalent organic group for $Z_{304}$ and $Z_{306}$ include an alkylene group including 1 to 10 carbon atoms (preferably linear or branched), an alkynediyl group including 2 to 10 carbon atoms, an alkenylene group including 2 to 10 carbon atoms, and the like.

Examples of the divalent aromatic hydrocarbon group of the divalent organic group for $Z_{304}$ and $Z_{306}$ include a substituted or unsubstituted phenylene group, a substituted or unsubstituted biphenyldiyl group, a substituted or unsubstituted naphthylene group, and the like.

Examples of the divalent fluorene group (a fluorenediyl group) for $Z_{305}$ include a 9,9-fluorenediyl group, and the like.

Examples of the divalent naphthalene group (a naphthalenediyl group or a naphthylene group) for $Z_{305}$ include a 1,5-naphthylene group, a 1,6-naphthylene group, a 1,7-naphthylene group, a 1,8-naphthylene group, a 2,6-naphthylene group, a 2,7-naphthylene group, and the like.

From the viewpoint of increasing the heat deformation resistance of a molded article to be obtained, it is preferable that $Y_{301}$, $Y_{302}$, and $Y_{303}$ are hydroxy group-substituted propylene groups, $Z_{301}$ and $Z_{303}$ are phenylene groups, and $Z_{302}$ is $-C(CH_3)_2-$.

Examples of the compound represented by the formula (C1) include EPOXYESTER 3002M, EPOXYESTER 3002MK, EPOXYESTER 3002A, EPOXYESTER 3000M, EPOXYESTER 3000MK, and EPOXYESTER 3000A (manufactured by KYOEISHA CHEMICAL Co., LTD.), and the like.

In addition, from the viewpoint of increasing the heat deformation resistance of a molded article to be obtained, it is preferable that $Y_{301}$, $Y_{302}$, and $Y_{303}$ are hydroxy group-substituted propylene groups, $Z_{301}$ and $Z_{303}$ are cyclohexylene groups, and $Z_{302}$ is $—C(CH_3)_2—$.

In one embodiment, the component (C) contains the compound represented by the formula (C1).

In one embodiment, the component (C) contains the polymer containing one or more structural units represented by the formula (C2) and one or more structural units represented by the formula (C3).

The polymer containing one or more structural units represented by the formula (C2) and one or more structural units represented by the formula (C3) may be a random copolymer or a block copolymer, and is preferably a block copolymer, and is more preferably a triblock copolymer represented by the following formula (C4).

(C4)

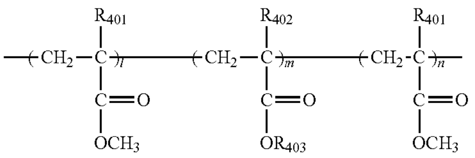

In the formula (C4), $R_{401}$ to $R_{403}$ are as defined in the formulas (C2) or (C3).

l, m, and n are the average number of the constituent units of each block, preferably (l+n):m is 5 to 65:95 to 35, and more preferably 10 to 55:90 to 45.

Examples of the commercially available polymer containing at least one structural unit represented by the formula (C2) and at least one structural unit represented by the formula (C3) include KURARITY manufactured by KURARAY CO., LTD., and the like.

In the polymer containing one or more structural units represented by the formula (C2) and one or more structural units represented by the formula (C3), the ratio of the structural unit represented by the formula (C3) to the sum of the structural unit represented by the formula (C2) and the structural unit represented by the formula (C3) is preferably 50% to 98%, and more preferably 60% to 95%.

The polymer containing one or more structural units represented by the formula (C2) and one or more structural units represented by the formula (C3), and the triblock copolymer represented by the formula (C4) preferably have a number-average molecular weight (Mn) of 3000 or more, more preferably 5000 or more, and still more preferably 8000 or more, and preferably 150,000 or less, more preferably 130,000 or less, and still more preferably 110,000 or less.

The weight-average molecular weight (Mw) thereof is preferably 5000 or more, more preferably 8000 or more, and still more preferably 10,000 or more, and is preferably 200,000 or less, more preferably 170,000 or less, and still more preferably 150,000 or less.

The molecular weight distribution (Mw/Mn) thereof is preferably 6 or less, more preferably 5 or less, and still more preferably 3 or less. The molecular weight distribution (Mw/Mn) thereof is particularly preferably 1.

The component (C) may be used alone or in combination of two or more.

The content of the component (C) is preferably 5% by mass or more and 50% by mass or less, and more preferably 10% by mass or more and 40% by mass or less, based on a total of 100% by mass of the components other than the component (B) (when a component (E), a component (F), and an additive described later are contained, components excluding the component (B), the component (E), the component (F), and the additive) (that is, based on a total of 100% by mass of the component (A) and the component (C) (when the component (D) described later is contained, a total of 100% by mass of the component (A), the component (C), and the component (D))).

(Component (D))

From the viewpoint of mechanical property, heat resistance, waterproofness, and water vapor barrier property, the thermosetting composition for injection molding of the invention preferably further contains, as a component (D), a compound represented by the following formula (D1).

(D1)

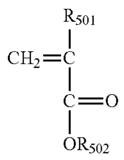

In the formula (D1), $R_{501}$ is a hydrogen atom or a methyl group.

$R_{502}$ is a substituted or unsubstituted aliphatic hydrocarbon group including 1 to 30 (preferably 1 to 20, more preferably 1 to 12) carbon atoms.

Provided that a di(meth)acrylate compound having the structural unit represented by the formula (A1) is excluded.

The aliphatic hydrocarbon group is preferably an alkyl group, more preferably a linear alkyl group including 8 or more carbon atoms (preferably including 8 to 24 carbon atoms, more preferably including 9 to 18 carbon atoms).

The acrylate compound or the methacrylate compound in which the aliphatic hydrocarbon group is ester-bonded, may have two or more (preferably two) (meth)acrylate groups.

When the number of (meth)acrylate groups is two, the aliphatic hydrocarbon group is preferably an alkylene group, more preferably a linear alkylene group including 8 or more carbon atoms (preferably including 8 to 24 carbon atoms, more preferably including 9 to 18 carbon atoms).

Specific examples of the alkyl group including 8 or more carbon atoms include a decyl group, a dodecyl group (including a lauryl group), a tridecyl group, a tetradecyl group, a hexadecyl group, an octadecyl group (including a stearyl group), an eicosyl group, a triacontyl group, a tetracontyl group, and the like. The alkyl group or alkylene group including 8 or more carbon atoms may be an alkyl group or an alkylene group derived from a hydride of a polymer such as polybutadiene or polyisoprene. Specific examples of the alkylene group including 8 or more carbon atoms include a divalent residue obtained by removing a hydrogen atom from the above-mentioned alkyl group.

Specific examples of the acrylate compound or methacrylate compound in which an aliphatic hydrocarbon group is ester-bonded include lauryl (meth)acrylate (for example, 1-lauryl methacrylate), tridecyl (meth)acrylate, tetradecyl (meth)acrylate, hexadecyl (meth)acrylate, stearyl (meth) acrylate, eicosyl (meth)acrylate, triacontyl (meth)acrylate, tetracontyl (meth)acrylate, isooctyl (meth)acrylate, isodecyl (meth)acrylate, and the like.

In addition, examples thereof include an acrylic compound or a methacrylic compound having a hydrogenated polybutadiene skeleton such as hydrogenated polybutadiene di(meth)acrylate, an acrylic compound or a methacrylic compound having a hydrogenated polyisoprene skeleton such as hydrogenated polyisoprene di(meth)acrylate, a polyester acrylate, 1,10-decanediol di(meth)acrylate, and the like.

The substituted or unsubstituted alicyclic hydrocarbon group including 6 or more ring carbon atoms is preferably one or more groups selected from the group consisting of a substituted or unsubstituted adamantyl group, a substituted or unsubstituted norbornyl group, a substituted or unsubstituted isobornyl group, and a substituted or unsubstituted dicyclopentanyl group, from the viewpoint of heat resistance and waterproofness.

As the acrylate compound or methacrylate compound in which a substituted or unsubstituted alicyclic hydrocarbon group including 6 or more ring carbon atoms is ester-bonded for the formula (D1), compounds represented by the following formulas (I) to (IV) are preferred.

(I)

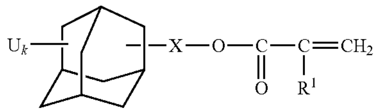

(II)

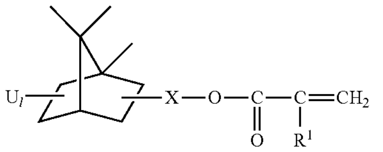

(III)

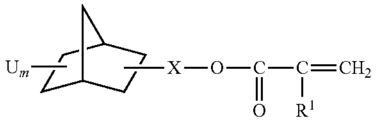

(IV)

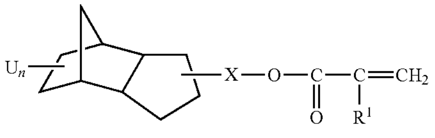

In the formulas (I), (II), (III), and (IV), $R^1$'s independently represent a hydrogen atom or a methyl group.

X's independently represent a single bond, an alkylene group including 1 to 4 (preferably 1 or 2) carbon atoms, or an oxyalkylene group including 1 to 4 (preferably 1 or 2) carbon atoms, and preferably a single bond.

U's independently represent a hydrogen atom, an alkyl group including 1 to 4 (preferably 1 or 2) carbon atoms, a halogen atom, a hydroxy group, or a =O group. k is an integer of 1 to 15. l is an integer of 1 to 8. m is an integer of 1 to 11. n is an integer of 1 to 15.

When two or more U's are present, the two or more U's may be the same as or different from each other.

Examples of the alkylene group including 1 to 4 carbon atoms for X include, for example, a methylene group, an ethylene group, a trimethylene group, a propylene group, a tetramethylene group, a butylene group, a 2-methyltrimethylene group, and the like.

Examples of the oxyalkylene group including 1 to 4 carbon atoms for X include, for example, an oxymethylene group, an oxyethylene group, an oxypropylene group, an oxybutylene group, and the like.

The =O group for U is a double bond group with an oxygen atom, and in the alicyclic hydrocarbon group for the compounds represented by the formulas (I) to (IV), it can be formed by removing two hydrogen atoms from a single carbon atom from which the two hydrogen atoms can be removed, and bonding to the single carbon atom.

Examples of the alkyl group including 1 to 4 carbon atoms for U include a methyl group, an ethyl group, a propyl group (for example, a n-propyl group or an isopropyl group), a butyl group (for example, a n-butyl group or an isobutyl group), and the like.

Examples of the halogen atom for U include a fluorine atom, a bromine atom, an iodine atom, and the like.

X is preferably a single bond, from the viewpoint of heat resistance and waterproofness.

The acrylate compound or methacrylate compound in which a substituted or unsubstituted alicyclic hydrocarbon group including 6 or more ring carbon atoms is ester-bonded is more preferably adamantyl methacrylate, cyclohexyl methacrylate, 1-norbornyl methacrylate, 1-isobornyl methacrylate, or 1-dicyclopentanyl methacrylate, and still more preferably 1-adamantyl methacrylate, 1-norbornyl methacrylate, or 1-isobornyl methacrylate.

The component (D) may contain acrylic acid, methacrylic acid, or a monofunctional acrylate compound or methacrylate compound having a polar group (with excluding the acrylate compound or methacrylate compound in which a substituted or unsubstituted alicyclic hydrocarbon group including 6 or more ring carbon atoms is ester-bonded), from the viewpoint of improving adhesion and wettability.

Examples of the polar group include a hydroxy group, an epoxy group, a glycidyl ether group, a tetrahydrofurfuryl group, an isocyanate group, a carboxyl group, an alkoxysilyl group, a phosphate ester group, a lactone group, an oxetane group, a tetrahydropyranyl group, an amino group, and the like.

Specific examples of the monofunctional (meth)acrylate compound having a polar group include 2-hydroxyethyl (meth)acrylate, 2-hydroxypropyl(meth)acrylate, 2-hydroxybutyl(meth)acrylate, 4-hydroxybutyl(meth)acrylate (trade name: 4-HBA, manufactured by Nippon Kasei Chemical Company Limited, for example), cyclohexanedimethanol mono(meth)acrylate (trade name: CHMMA, manufactured by Nippon Kasei Chemical Company Limited, for example), glycidyl(meth)acrylate, 4-hydroxybutylacrylate glycidyl ether (trade name: 4-HBAGE, manufactured by Nippon Kasei Chemical Company Limited, for example), tetrahydrofurfuryl(meth)acrylate, 2-isocyanatoethyl (meth)acrylate, 2-(meth)acryloyloxyethyl succinate, 2-(meth)acryloyloxyethyl hexahydrophthalate, 3-(meth) acryloxypropyltrimethoxysilane, 3-(meth) acryloxypropylmethyldimethoxysilane, 3-(meth) acryloxypropyltriethoxysilane, 3-(meth) acryloxypropylmethyldiethoxysilane, 2-(meth) acryloyloxyethyl phosphate, bis(2-(meth)acryloyloxyethyl) phosphate, KAYAMER PM-2 (trade name, manufactured by Nippon Kayaku Co., Ltd.), KAYAMER PM-21 (trade name, manufactured by Nippon Kayaku Co., Ltd.), γ-butyrolactone (meth)acrylate, 3-methyl-3-oxetanyl (meth)acrylate, 3-ethyl-3-oxetanyl (meth)acrylate, tetrahydrofurfuryl (meth)

acrylate, dimethylaminoethyl (meth)acrylate, diethylaminoethyl (meth)acrylate, and the like.

The component (D) preferably contains an acrylate compound or methacrylate compound having a glycidyl group, from the viewpoint of adhesion to a substrate.

The component (D) may contain a monofunctional acrylate compound or methacrylate compound other than those described above, from the viewpoint of viscosity adjustment, adjustment of hardness of a cured product, suppression of cracks, and the like.

Examples of the monofunctional acrylate compound or methacrylate compound other than the above-described component (D) include ethyl (meth)acrylate, n-butyl (meth) acrylate, isobutyl (meth)acrylate, t-butyl (meth)acrylate, 2-ethylhexyl methacrylate, isodecyl (meth)acrylate, lauryl (meth)acrylate, stearyl (meth)acrylate, methyl (meth)acrylate, butoxyethylene glycol (meth)acrylate, methoxydiethylene glycol (meth)acrylate, butoxypolyethylene glycol (meth)acrylate, methoxypolyethylene glycol (meth)acrylate, urethane (meth)acrylate, and the like.

It is preferable that the monofunctional acrylate compound or methacrylate compound other than the above-described component (D) does not have an aliphatic urethane structure (for example, —NH—C(═O)—O—), from the viewpoint of suppressing discoloration to yellow or the like during heat curing.

The component (D) may contain a polyfunctional acrylate or methacrylate compound (preferably having two to five functional groups), from the viewpoint of mechanical strength and curing rate, as long as the effects of the invention is not inhibited.

Examples of the polyfunctional acrylate compound or methacrylate compound for the component (D) include tricyclodecanedimethanol di(meth)acrylate, 1,10-decanediol di(meth)acrylate, 1,9-nonanediol di(meth)acrylate, trimethylolpropane tri(meth)acrylate, dipropylene glycol di(meth) acrylate, alkoxylated hexanediol di(meth)acrylate, alkoxylated aliphatic di(meth)acrylate, polyethylene glycol di(meth)acrylate, tetraethylene glycol di(meth)acrylate, tripropylene glycol di(meth)acrylate, and the like.

From the viewpoint of heat resistance, the polyfunctional acrylate compound or methacrylate compound for the component (D) preferably does not has an aliphatic urethane structure (for example, —NH—C(═O)—O—).

In one embodiment, the compound represented by the formula (D1) does not contain a polybutadiene di(meth) acrylate having a structural unit represented by the following formula (1A) and a structural unit represented by the following formula (1B).

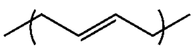
(1A)

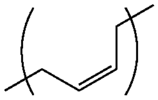
(1B)

The component (D) may be used alone or in combination of two or more.

In the case where the component (D) is contained, the content of the component (D) (when two or more of the components (D) are used in combination, the total content of the two or more of the components (D)) is preferably 1% by mass or more and 80% by mass or less, and more preferably 10% by mass or more and 60% by mass or less, based on a total of 100% by mass of the components other than the component (B) (when the component (E), the component (F), and the additive described later are contained, the components excluding the component (B), the component (E), the component (F), and the additive) (that is, based on a total of 100% by mass of the component (A) and the component (D) (when the component (C) is contained, a total of 100% by mass of the component (A), the component (C), and the component (D))).

When the content of the component (D) is within the above range, it is possible to maintain moldability and increase waterproofness and heat resistance.

(Component (E))

The thermosetting composition for injection molding of the invention may further contain an inorganic filler, as a component (E). By the addition of the component (E), a molded article having excellent flame retardancy can be obtained.

The component (E) is preferably one or more selected from the group consisting of magnesium hydroxide and aluminum hydroxide, and more preferably aluminum hydroxide.

The average particle size of the component (E) is preferably 0.05 to 100 μm, more preferably 0.05 to 20 μm.

When the average particle size is within the above range, the occurrence of molding defects and defective products can be suppressed.

The average particle size of the component (E) is measured using a laser diffraction type particle size distribution measurement device.

The component (E) may be spherical or plate-shaped.

The component (E) may be used alone or in combination of two or more.

In the case where the component (E) is contained, the content of the component (E) is preferably 40 parts by mass to 250 parts by mass, more preferably 40 parts by mass to 200 parts by mass, based on a total of 100 parts by mass of the components other than the component (B) and the component (E) (when the component (F) and additive described later are contained, the components excluding the component (B), the component (E), the component (F), and the additive) (that is, based on 100 parts by mass of the component (A) (when the component (C) is contained, based on a total of 100 parts by mass of the component (A) and the component (C); when the component (D) is contained, based on a total of 100 parts by mass of the component (A) and the component (D); when the component (C) and the component (D) is contained, based on a total of 100 parts by mass of the component (A), the component (C), and the component (D))).

(Component (F))

The thermosetting composition for injection molding of the invention may further contain a phosphate ester-based flame retardant, as a component (F). By the addition of the component (F), a molded article having excellent flame retardancy can be obtained.

Examples of the phosphate ester-based flame retardant include trimethyl phosphate, triethyl phosphate, tributyl phosphate, trioctyl phosphate, tri(butoxyethyl) phosphate, triphenyl phosphate, tricresyl phosphate, cresyl diphenyl phosphate, octyl diphenyl phosphate, tri(2-ethylhexyl) phosphate, diisopropyl phenyl phosphate, trixylenyl phosphate, tris(isopropylphenyl) phosphate, trinaphthyl phosphate, bisphenol A bisdiphenyl phosphate, hydroquinone bisdiphenyl phosphate, resorcin bisdiphenyl phosphate, resorcinol diphenyl phosphate, trioxybenzene triphenyl, cresyl diphenyl phosphate, and the like.

The substituted product of the phosphate ester-based flame retardant and the fused product of the phosphate ester-based flame retardant can also be used.

Examples of commercial products of the phosphate ester-based flame retardant include TPP [triphenyl phosphate], TXP [trixylenyl phosphate], CDP [cresyl diphenyl phosphate], TCP [tricresyl phosphate], CR-733S [resorcinol bis (diphenyl phosphate)], CR741 [phenol A bis (diphenyl phosphate)], PX200 [1,3-phenylene-tetrakis(2,6-dimethylphenyl)phosphate ester], PX201 [1,4-phenylene-tetrakis(2,6-dimethylphenyl)phosphate ester], PX202 [4,4'-biphenylene-teslakis(2,6-dimethylphenyl)phosphate ester], which are manufactured by DAIHACHI CHEMICAL INDUSTRY CO., LTD.; FP2010 manufactured by ADEKA CORPORATION; REOFOS 35 manufactured by Ajinomoto Fine-Techno Co., Inc.; and the like.

The component (F) may be used alone or in combination of two or more.

In the case where the component (F) is contained, the content of the component (F) is preferably 1 parts by mass to 50 parts by mass, more preferably 5 parts by mass to 30 parts by mass, still more preferably 10 parts by mass to 25 parts by mass, based on a total of 100 parts by mass of the components other than the component (B), the component (E), and the component (F) (when the additive described later are contained, the components excluding the component (B), the component (E), the component (F), and additive) (that is, based on a total of 100 parts by mass of the component (A) (when the component (C) is contained, based on a total of 100 parts by mass of the component (A) and the component (C); when the component (D) is contained, based on a total of 100 parts by mass of the component (A) and the component (D); when the component (C) and the component (D) are contained, based on a total of 100 parts by mass of the component (A), the component (C), and the component (D))).

(Additive)

The thermosetting composition for injection molding of the invention may further contain an additive as long as the effect of the invention is not inhibited. Examples of the additive include an antioxidant, a light stabilizer, a flame retardant other than the phosphate ester-based flame retardant, an ultraviolet absorber, a plasticizer, a colorant, an antistatic agent, a lubricant, a mold releasing agent, a leveling agent, an antifoaming agent, and the like. Known additives can be used as these additives.

Examples of the antioxidant include a phenol-based antioxidant, a phosphorus-based antioxidant, a sulfur-based antioxidant, a vitamin-based antioxidant, a lactone-based antioxidant, an amine-based antioxidant, and the like.

Examples of the phenol-based antioxidant include tetrakis [methylene-3-(3,5-di-t-butyl-4-hydroxyphenyl)propionate] methane, β-(3,5-di-t-butyl-4-hydroxyphenyl)propionate stearyl ester, 1,3,5-trimethyl-2,4,6-tris(3,5-di-t-butyl-4-hydroxybenzyl)benzene, tris(3,5-di-t-butyl-4-hydroxybenzyl) isocyanurate, tris[(3,5-di-t-butyl-4-hydroxyphenyl)propionyloxyethyl]isocyanurate, 2,6-di-t-butyl-4-methylphenol, 3,9-bis[1,1-dimethyl-2-{β-(3-t-butyl-4-hydroxy-5-methylphenyl)propionyloxy}ethyl]-2,4,8,10-tetraoxaspiro[5,5] undecane, 3,9-bis[2-[3-(3-tert-butyl-4-hydroxy-5-methylphenyl)-propionyloxy]-1,1-dimethylethyl]-2,4,8,10-tetraoxaspiro[5.5]undecane, tris(2,6 dimethyl-3-hydroxy-4-t-butylbenzyl)isocyanurate, and the like. Commercially available products such as IRGANOX 1010, IRGANOX 1076, IRGANOX 1330, IRGANOX 3114, IRGANOX 3125, IRGANOX 3790 (all manufactured by BASF SE); CYANOX 1790 (manufactured by American Cyanamid); SUMILIZER BHT, SUMILIZER GA-80 (all manufactured by SUMITOMO CHEMICAL COMPANY, LIMITED), and the like can be used (all are trade names).

Examples of the phosphorus-based antioxidant include tris(2,4-di-t-butylphenyl)phosphite, 2-[[2,4,8,10-tetrakis(1,1-dimethylethyl)dibenzo[d,f][1,3,2]dioxaphosphepin-6-yl] oxy]N,N-bis[2-[[2,4,8,10-tetrakis(1,1-dimethylethyl) dibenzo[d,f][1,3,2]dioxaphosphepin-6-yl]oxy]-ethyl] ethanamine, cyclic neopentane tetrabis(2,6-di-t-butyl-4-methylphenyl)phosphite, distearyl pentaerythritol diphosphite, and the like. Commercially available products such as IRGAFOS 168, IRGAFOS 12, IRGAFOS 38 (all manufactured by BASF SE); ADK STAB 329K, ADK STAB PEP36, ADK STAB PEP-8 (all manufactured by ADEKA CORPORATION); Sandstab P-EPQ (manufactured by Clariant AG); Weston 618, Weston 619G, Weston 624 (manufactured by General Electric Company), and the like can be used (all are trade names).

Examples of the sulfur-based antioxidant include dilauryl thiodipropionate, distearyl thiodipropionate, dimyristyl thiodipropionate, lauryl stearyl thiodipropionate, pentaerythritol tetrakis(3-dodecyl thiopropionate), pentaerythritol tetrakis (3-lauryl thiopropionate), and the like. Commercially available products such as DSTP "Yoshitomi," DLTP "Yoshitomi," DLTOIB, DMTP "Yoshitomi" (all manufactured by API Corporation); Seenox 412S (manufactured by SHIPRO KASEI KAISHA, LTD.); Cyanox 1212 (manufactured by American Cyanamid); and SUMILIZER TP-D (manufactured by SUMITOMO CHEMICAL COMPANY, LIMITED) can be used (all are trade names).

Examples of the vitamin-based antioxidant include tocopherol, 2,5,7,8-tetramethyl-2-(4',8',12'-trimethyltridecyl)coumaron-6-ol, and the like; and commercially available products such as IRGANOX E201 (manufactured by BASF SE) can be used.

As the lactone-based antioxidant, those described in JP H07-233160 A and JP H07-247278 A can be used. In addition, HP-136 (trade name, manufactured by BASF SE, compound name: 5,7-di-t-butyl-3-(3,4-dimethylphenyl)-3H-benzofuran-2-one) and the like can be used.

Examples of the amine-based antioxidant include commercially available products such as IRGASTAB FS 042 (BASF SE) and GENOX EP (manufactured by CROMPTON CORPORATION, compound name: dialkyl-N-methylamine oxide) (all are trade names).

The antioxidant may be used alone or in combination of two or more.

When the antioxidant is contained, from the viewpoint of not inhibiting the effect of the invention, the content of the antioxidant is preferably 0.001 to 20 parts by mass, based on a total of 100 parts by mass of the components other than the component (B), the component (E), and the component (F) (when other additives are contained, the component excluding the component (B), the component (E), the component (F), and the additive) (that is, based on 100 parts by mass of the component (A) (when the component (C) is contained, based on a total of 100 parts by mass of the component (A) and the component (C); when the component (D) is contained, based on a total of 100 parts by mass of the component (A) and the component (D); and when the component (C) and the component (D) are contained, based on a total of 100 parts by mass of the component (A), the component (C) and the component (D))).

As the light stabilizer, any light stabilizer such as an ultraviolet absorber or a hindered amine-based light stabilizer can be used, and is preferably a hindered amine-based light stabilizer.

Specific examples of the hindered amine-based light stabilizer include ADK STAB LA-52, LA-57, LA-62, LA-63, LA-67, LA-68, LA-77, LA-82, LA-87, and LA-94 (all manufactured by ADEKA CORPORATION), Tinuvin 123, 144, 440, 662, 765, 770DF, Tinuvin XT 850 FF, Tinuvin XT 855 FF, Chimassorb 2020, 119, and 944 (all manufactured by BASF SE), Hostavin N30 (manufactured by Hoechst AG), Cyasorb UV-3346, and UV-3526 (manufactured by Cytec Industries Inc.), Uval 299 (manufactured by GLC), Sanduvor PR-31 (manufactured by ClariantAG), and the like (all are trade names).

Specific examples of the ultraviolet absorber include ADK STAB LA-31, ADK STAB LA-32, ADK STAB LA-36, ADK STAB LA-29, ADK STAB LA-46, ADK STAB LA-F70, and ADK STAB 1413 (all manufactured by ADEKA CORPORATION), Tinuvin P, Tinuvin 234, Tinuvin 326, Tinuvin 328, Tinuvin 329, Tinuvin 213, Tinuvin 571, Tinuvin 765, Tinuvin 1577ED, Chimassorb 81, and Tinuvin 120 (all manufactured by BASF SE), and the like. Among them, Tinuvin series ultraviolet absorbers manufactured by BASF SE are preferable, and Tinuvin765 is more preferable.

The light stabilizer may be used alone or in combination of two or more.

When the light stabilizer is contained, from the viewpoint of not inhibiting the effect of the invention, the content of the light stabilizer is preferably 0.001 to 20 parts by mass, based on a total of 100 parts by mass of the components other than the component (B), the component (E), and the component (F) (when other additives are contained, the components excluding the component (B), the component (E), the component (F), and the additive) (that is, based on 100 parts by mass of the component (A) (when the component (C) is contained, based on a total of 100 parts by mass of the component (A) and the component (C); when the component (D) is contained, based on a total of 100 parts by mass of the component (A) and the component (D); and when the component (C) and the component (D) are contained, based on a total of 100 parts by mass of the component (A), the component (C) and the component (D))).

Examples of the flame retardant other than the phosphate ester-based flame retardant include

- a phosphorus-based flame retardant other than the phosphate ester-based flame retardant;
- a halogen-based flame retardant;
- a nitrogen-based compound;
- a metal hydroxide;
- a silicone-based flame retardant;
- an organic alkali metal salt;
- an organic alkaline earth metal salt, and the like.

Examples of the phosphorus-based flame retardant other than the phosphate ester-based flame retardant include a phosphorus-based flame retardant containing no halogen.

Examples of the phosphorus-based flame retardant containing no halogen include a halogen-free phosphorus-based flame retardant, a halogen-free organophosphorus-based flame retardant, and the like. Examples of the halogen-free organophosphorus-based flame retardant other than the phosphate ester-based flame retardant include a phosphate amine salt, ammonium polyphosphate, and the like.

Examples of the halogen-free phosphorus-based flame retardant include red phosphorus.

Examples of the phosphate amine salt include an orthophosphate amine salt, a pyrophosphate salt, a fused phosphate salt, and the like.

Examples of the phosphate for the phosphate amine salt include orthophosphoric acid ($H_3PO_4$), pyrophosphoric acid, fused phosphoric acid, and the like.

Examples of the amine for the phosphate amine salt include 1,2-diaminoethane, 1,3-diaminopropane, 1,4-diaminobutane, 1,5-diaminopentane, 1,6-diaminohexane, urea, N,N'-dimethylurea, thiourea, isocyanuric acid, ethylene urea, ethylenethiourea, hydantoin, hexahydropyrimidin-2-one, parabanic acid, barbituric acid, ammeline, melon, melame, guanazole, guanadine, guanidine, ethyleneimine, pyrrolidone, 2-pyrrolidone, 3-pyrrolidone, piperidine, morpholine, thiomorpholine, α-piperidone, β-piperidone, γ-piperidone, piperazine, 4-methylpiperazine, 2-methylpiperazine, 2,5-dimethylpiperazine, 2,3,5,6-tetramethylpiperazine, 2-ethylpiperazine, 2,5-diethylpiperazine, melamine, guanamine, methylguanamine, ethylguanamine, benzoguanamine, benzylguanamine, dicyandiamide, 1,3-diaminobenzene, 1,4-diaminobenzene, 2,4 diaminotoluene, 2,4 diamino-6-morpholino-1,3,5-triazine, 2,4-diamino-6-thiomorpholino-1,3,5-triazine, and the like.

Here, the fused phosphoric acid refers to polyphosphoric acid in which three or more molecules of phosphoric acid are fused, and may be triphosphoric acid, tetraphosphoric acid, a fused product of higher number of phosphoric acids, or a mixture thereof. The fused phosphoric acid is mainly composed of a linear structure, and may contain a branched structure and a cyclic structure.

Examples of the commercially available product for the phosphate amine salt include FP2050 (manufactured by ADEKA Corporation), and the like.

The polyphosphoric acid for the ammonium polyphosphate is the same as the fused phosphoric acid described above.

Examples of the commercially available product of ammonium polyphosphate include AP-422 (manufactured by Clariant AG), TERRJU-S10 (manufactured by Booden Heim Co.), TERRJU-S20 (manufactured by Booden Heim Co.), and the like.

Since ammonium polyphosphate is likely to be hydrolyzed, ammonium polyphosphate with suppressed to be hydrolyzed can also be used, such as ammonium polyphosphate microencapsulated with a thermosetting resin, one treated with a coating or the like with a melamine monomer or other nitrogen-containing organic compound, one treated with a surfactant or a silicone compound, or one poorly solubilized obtained by adding melamine or the like during the process of producing ammonium polyphosphate.

Examples of commercially available products of the ammonium polyphosphate with suppressed to be hydrolyzed include AP-462 (manufactured by Clariant AG, Ltd.), TERRJU-C30 (manufactured by Chemische Fabrik Budenheim KG), TERRJU-C60 (manufactured by Chemische Fabrik Budenheim KG), TERRJU-C70 (manufactured by Chemische Fabrik Budenheim KG), TERRJU-C80 (manufactured by Chemische Fabrik Budenheim KG), and the like.

Examples of the flame retardant other than the phosphate-based flame retardant include a halogen-based flame retardant, from the viewpoint of increasing flame retardancy.

Examples of the halogen-based flame retardant include 2,4,6-tris(2,4,6-tribromophenoxy)-1,3,5-triazine, brominated epoxy oligomer, ethylene bis(pentabromophenyl), ethylene bis(tetrabromophthalimide), decabromo diphenyl ether, tetrabromo bisphenol A, halogenated polycarbonate, halogenated polycarbonate (co)polymer, an oligomer of halogenated polycarbonate or halogenated polycarbonate (co)polymer, halogenated polystyrene, halogenated polyolefin, and the like.

Examples of the halogen-based flame retardant include a bromine-based flame retardant.

From the viewpoint of increasing flame retardancy, it is preferable to contain a bromine-based flame retardant.

Examples of the brominated flame retardant include tris(tribromoneopentyl)phosphate, tris-dibromopropylisocyanurate, and the like.

From the viewpoint of increasing flame retardancy, it is preferable to contain tris(tribromoneopentyl)phosphate.

In the case of halogen-free applications, it is preferable to select a flame retardant other than the halogen-based flame retardant (e.g., bromine-based flame retardant).

Examples of the nitrogen-based compound include melamine, an alkyl group or aromatic group-substituted melamine, and the like.

Examples of the metal hydroxide include aluminum hydroxide, magnesium hydroxide, calcium hydroxide, barium hydroxide, zirconium hydroxide, basic magnesium carbonate ($mMgCO_3 \cdot Mg(OH)_2 \cdot nH_2O$ (e.g., m=3 to 5, n=3 to 7)), dolomite, zinc hydroxystannate, tin oxide hydrate, borax ($Na_2B_4O_5(OH)_4 \cdot 8H_2O$), and the like.

Examples of the silicone-based flame retardant include silicone oil, silicone resin, and the like, and more specific examples include a silicone-based compound having a specific structure having a reactive group such as an alkoxy group and an epoxy group, and silicone resin having a specific molecular weight different in the oxygen amount in the repeating unit (see JP H06-306265 A, JP H06-336547 A, JP H08-176425 A, JP H10-139964 A, and the like).

As the silicone-based flame retardant, a functional group-containing silicone compound, for example, (poly)organosiloxanes having a functional group is preferable.

The silicone-based flame retardant is usually in the form of a liquid, powder, or the like, and is preferably in a form having good dispersibility in melt-kneading. For example, one in a liquid form having a viscosity of about 10 to 500,000 cst (centistokes) at room temperature may be mentioned.

In the case where the silicone-based flame retardant is a functional group-containing silicone compound, even in a liquid form, the silicone-based flame retardant can be uniformly dispersed in the flame retardant resin composition, and bleeding can be suppressed at the time of molding or on the surface of the molded article.

Examples of the organic alkali metal salt and the organic alkaline earth metal salt include an alkali metal salt or an alkaline earth metal salt of an organic acid, and the like.

Examples of the organic acid include an organic sulfonic acid (e.g., methanesulfonic acid), an organic carboxylic acid, and the like. Examples of the alkali metal include sodium, potassium, lithium, cesium, and the like, and examples of the alkaline earth metal include magnesium, calcium, strontium, barium, and the like.

The organic alkali metal salt and the organic alkaline earth metal salt are preferably a salt of sodium, a salt of potassium, or a salt of cesium. The organic acid may be substituted with a halogen such as fluorine, chlorine, or bromine.

Among the organic alkali metal salt and the organic alkaline earth metal salt, an alkali metal salt or alkaline earth metal salt of perfluoroalkanesulfonic acid is preferable.

Examples of the perfluoroalkanesulfonic acid include perfluoromethanesulfonic acid, perfluoroethanesulfonic acid, perfluoropropanesulfonic acid, perfluorobutanesulfonic acid, perfluoromethylbutanesulfonic acid, perfluorohexanesulfonic acid, perfluoroheptanesulfonic acid, perfluorooctanesulfonic acid, and the like.

In particular, potassium salts of these perfluoroalkanesulfonic acids are preferably used.

In addition to the perfluoroalkanesulfonic acid, examples of the organic sulfonic acid include 2,5-dichlorobenzenesulfonic acid; 2,4,5-trichlorobenzenesulfonic acid; diphenylsulfone-3-sulfonic acid; diphenylsulfone-3,3'-disulfonic acid; naphthalenetrisulfonic acid; and the like.

Alkali metal salts or alkaline earth salts of a resin (for example, thermoplastic resin) in which a sulfonic acid or the like is substituted to the aromatic ring of the aromatic vinyl-based resin can also be used as a flame retardant.

Examples of the aromatic vinyl-based resin include thermoplastic resins having a styrene structure such as polystyrene, rubber-modified polystyrene, styrene-acrylonitrile copolymer, ABS resin (acetylene-butadiene-styrene copolymer), and the like. Among these, polystyrene is preferably used.

Examples of the organic carboxylic acid include perfluoroformic acid, perfluoromethane carboxylic acid, perfluoroethane carboxylic acid, perfluoropropane carboxylic acid, perfluorobutane carboxylic acid, perfluoromethylbutane carboxylic acid, perfluorohexane carboxylic acid, perfluoroheptane carboxylic acid, perfluorooctane carboxylic acid, and the like.

Examples of the flame retardant other than the phosphate ester-based flame retardant also include:

boric acid compounds such as zinc borate, zinc metaborate, barium metaborate, aluminum borate, and sodium polyborate;

silicon compounds such as silica (silicon dioxide), synthetic amorphous silica (silicon dioxide), aluminum silicate, magnesium silicate, calcium silicate, zirconium silicate, and diatomaceous earth;

metal oxides such as aluminum oxide, magnesium oxide, barium oxide, titanium oxide, zinc oxide, tin oxide, zirconium oxide, molybdenum oxide, and zirconium-antimony composite oxide;

expandable graphites, and the like.

As the expandable graphite, one having the degree of swelling at 300° C. of 185 cc/g or larger, and the particle size at 22 mesh-on of 5% or less is preferable, from the viewpoint of suppressing the occurrence of cracks.

The flame retardant other than the phosphate ester-based flame retardant may be used alone or in combination of two or more.

When the flame retardant other than the phosphoric ester-based flame retardant is contained, the content of the flame retardant other than the phosphoric ester-based flame retardant is preferably 0.001 to 20 parts by mass, based on a total of 100 parts by mass of the components other than the component (B), the component (E), and the component (F) (when other additives are contained, the components excluding the component (B), the component (E), the component (F), and the additive) (that is, based on 100 parts by mass of the component (A) (when the component (C) is contained, based on a total of 100 parts by mass of the component (A) and the component (C); when the component (D) is contained, based on a total of 100 parts by mass of the component (A) and the component (D); and when the component (C) and the component (D) are contained, based on a total of 100 parts by mass of the component (A), the component (C) and the component (D))).

By the addition of the flame retardant other than the phosphoric ester-based flame retardant, flame retardancy can be increased.

From the viewpoint of imparting a ductility effect to the thermosetting composition for injection molding of the invention, a plasticizer may be blended. The plasticizer is not particularly limited, and examples thereof include:

as the phthalate ester-based ones, dimethyl phthalate, diethyl phthalate, dibutyl phthalate, dioctyl phthalate, disononyl phthalate (phthalic acid diisononyl), diundecyl phthalate, bis(2-ethylhexyl) phthalate, diisodecyl phthalate, butyl benzyl phthalate, diisononyl phthalate, ethyl phthalyl ethyl glycolate, and the like, as the trimetate ester-based ones, tris(2-ethylhexyl)trimellitate, trioctyl trimellitate, triisononyl trimellitate, and the like, as the aliphatic dibasic acid ester-based ones, dibutyl adipate, diisobutyl adipate, bis(2-ethylhexyl)adipate, diisononyl adipate, diisononyl adipate, diisodecyl adipate, dioctyl adipate, bis[2-(2-butoxyethoxy)ethyl]adipate, bis[2-(2-butoxyethoxy)ethyl]adipate, bis(2-ethylhexyl)azelate, dibutyl sebacate, bis(2-ethylhexyl) sebacate, diethyl succinate, and the like, as the phosphate ester-based ones, trimethyl phosphate, triethyl phosphate, tributyl phosphate, tris(2-ethylhexyl) phosphate, triphenyl phosphate, tricresyl phosphate, trixylenyl phosphate, cresyl diphenyl phosphate, 2-ethylhexyl diphenyl phosphate, and the like, as the ricinoleic acid ester-based ones, methylacetylricinolate butylacetylricinolate, acetylated ricinoleic acid triglyceride, acetylated polyricinoleic acid triglyceride, and the like, as the polyester-based ones, adipic acid-1.3-butylene glycol-based polyesters, adipic acid-1.2-propylene glycol-based polyesters, and the like, as the acetic acid ester-based ones, glyceryl triacetate, and the like, as the sulfonamide-based ones, n-butylbenzenesulfonamide, and the like, and as the pyromellitic acid ester-based ones, tetraoctyl pyromellitate, tetraisononyl pyromellitate, and the like.

Among these, the phthalate ester-based plasticizer, the adipate ester-based plasticizer, and the phosphate ester-based plasticizer are preferable, and the phosphate ester-based plasticizer is more preferable.

The content of the plasticizer is usually 1 to 50 parts by mass, preferably 10 to 35 parts by mass, more preferably 15 to 30 parts by mass, based on a total of 100 parts by mass of the components other than the component (B), the component (E), and the component (F) (when other additives are contained, the components excluding the component (B), the component (E), the component (F), and the additive) (that is, based on 100 parts by mass of the component (A) (when the component (C) is contained, based on a total of 100 parts by mass of the component (A) and the component (C); when the component (D) is contained, based on a total of 100 parts by mass of the component (A) and the component (D); and when the component (C) and the component (D) are contained, based on a total of 100 parts by mass of the component (A), the component (C) and the component (D))).

The plasticizer may be used alone or in combination of two or more.

Examples of the mold releasing agent include an internal releasing agent.

The internal releasing agent is not particularly specified, and an aliphatic compound is desirable.

The aliphatic compound used as the internal releasing agent preferably has a melting point in the range of −40° C. to 180° C., and more preferably in the range of −30° C. to 180° C. By the use of the aliphatic compound having the melting point of −40° C. or higher no appearance defect is caused due to air bubbles generated within the product when the aliphatic compound evaporates during curing, and good mold releasability can be achieved. Further, by the use of the aliphatic compound having the melting point of 180° C. or lower, the solubility is increased, and good appearance of the product and mold releasability can be obtained.

Examples of the mold releasing agent include magnesium stearate, zinc stearate, and the like.

The mold releasing agent may be used alone or in combination of two or more.

When the mold releasing agent is contained, the content of the mold releasing agent is 0.001 to 20 parts by mass, based on a total of 100 parts by mass of the components other than the component (B), the component (E), and the component (F) (other additives are contained, the components excluding the component (B), the component (E), the component (F), and the additive) (that is, based on 100 parts by mass of the component (A) (when the component (C) is contained, based on a total of 100 parts by mass of the component (A) and the component (C); when the component (D) is contained, based on a total of 100 parts by mass of the component (A) and the component (D); and when the component (C) and the component (D) are contained, based on a total of 100 parts by mass of the component (A), the component (C) and the component (D))).

When the content is within the above range, the transferability of the mold shape and the shape stability against heat can be maintained, and good releasability can be exhibited.

The thermosetting composition for injection molding of the invention essentially consists of the component (A) and the component (B), and optionally the components (C) to (F) and the additives, and may contain other unavoidable impurities as long as the effects of the invention are not impaired.

For example, 40% by weight or more, 95% by weight or more, or 99% by weight or more, or 100% by mass of the thermosetting composition for injection molding of the invention may consist of the component (A) and the component (B), the components (A) to (D), the components (A) to (F), or the component (A) and the component (B), and optionally the components (C) to (F) and the additives.

[Production of Thermosetting Composition for Injection Molding]

The thermosetting composition for injection molding of the invention can be prepared by mixing the above components in a predetermined amount ratio. The mixing method is not particularly limited, and any known means such as a stirrer (mixer) can be used. In addition, mixing can be carried out under normal temperature, cooling, or heating, and under normal pressure, reduced pressure, or increased pressure.

[Method for Producing Molded Article]

In the method for producing a molded article of the invention, the method includes a step of supplying the above-described thermosetting composition for injection molding into a plunger (supplying step), a step of filling the supplied thermosetting composition for injection molding into a cavity of a mold in which a gauge pressure is −90 kPa or lower (vacuum pressure of 10 kPa), an oxygen amount is 0.2×volume of the cavity/22.4 mol or smaller, or a gauge pressure is −90 kPa or lower (vacuum pressure of 10 kPa)

and an oxygen amount is 0.2×volume of the cavity/22.4 mol or smaller, by the plunger (filling step), and a step of thermosetting the filed thermosetting composition for injection molding in the cavity (thermosetting step).

The method for producing a molded article according to the invention may include a step of extruding the thermoset resin from the cavity (mold releasing step).

In order to prevent only the resin component in the thermosetting composition for injection molding from being filled, injection molding such as transfer molding such as LTM (Liquid Transfer Molding), compression molding, LIM (Liquid Injection Molding), or the like is preferable. Pre-curing may be carried out.

By using the above-described thermosetting composition for injection molding, the thermosetting composition for injection molding can be filled even when filled by applying pressure to the inside of the mold, even when the pressure keeping is excessively applied after filling, and when the gap is 1 μm.

In transfer molding, a transfer molding machine (e.g., a liquid transfer molding machine G-Line) can be used, for example, to carry out molding at a mold clamping force of 5 to 20 kN, a molding temperature of 60 to 190° C. for a molding time of 30 to 500 seconds, and preferably at a molding temperature of 70 to 180° C. for a molding time of 30 to 180 seconds.

Post-curing may be carried out, for example, at 150 to 185° C. for 0.5 to 24 hours.

In liquid injection molding, for example, a liquid thermosetting resin injection molding machine LA-40S can be used, for example, to carry out molding at a mold clamping force of 10 kN to 40 kN, a molding temperature of 60 to 190° C. for a molding time of 30 to 500 seconds, and preferably at a molding temperature of 70 to 180° C. for a molding time of 20 to 180 seconds.

The above-described molding machine preferably has a plunger and a mold having a cavity. The above-described molding machine preferably further has a shut-off nozzle.

FIG. 1 is a view showing one embodiment of a filling device of a molding machine in which an injection molding method can be performed in the method for producing a molded article of the invention.

The molding machine of FIG. 1 is an injection molding machine having a plunger mechanism for injecting a thermosetting composition for injection molding into a mold, and has a filling device 10 having a plunger 11 shown in FIG. 1, a mold 20 having a cavity 21 shown in FIG. 2(A), and a depressurization device as a degassing device connected to pores for degassing the cavity 21 in the mold 20 (not shown), a heating device as a heating means connected to the mold 20, and a cooling device. The molding material is the thermosetting composition for injection molding of the invention.

In another embodiment, the molding machine may has an inert gas displacing device as a means connected to the pores for displacing the cavity in the mold with an inert gas.

As the filling device 10, a filling device having a known plunger can be used. Usually, as shown in FIG. 1, the filling device 10 having a plunger 11 has a feed portion and a function of backflow prevention, and the backflow preventing valve 12 (the backflow preventing valve may have a screw shape) is moved back and forth to feed, stir, and mix the material input from the input port (not shown), but in this embodiment, it is not necessary to stir and mix the thermosetting composition for injection molding in order to input it, because of it being a uniform liquid.

In the filling step into the cavity using the plunger, it is preferable to fill with the thermosetting composition for injection molding into the cavity of the mold through a flow path controlled its temperature to 50° C. or lower. When the molding method of the invention is carried out using the device shown in FIG. 2, the flow path corresponds to a flow path (not shown) in the filling device 10 and an introduction path in the mold 20 through which the thermosetting composition for injection molding flows.

In the method of the invention, in the step of filling into the cavity of the mold, which is preferably red to use a plunger filled with the thermosetting composition for injection molding, a gate system that blocks flow and heat transfer of the curing liquid at the path (flow path) portion between the plunger and the cavity is provided. Hereinafter, the molding method of the invention will be described with reference to FIG. 2.

Figure 2:
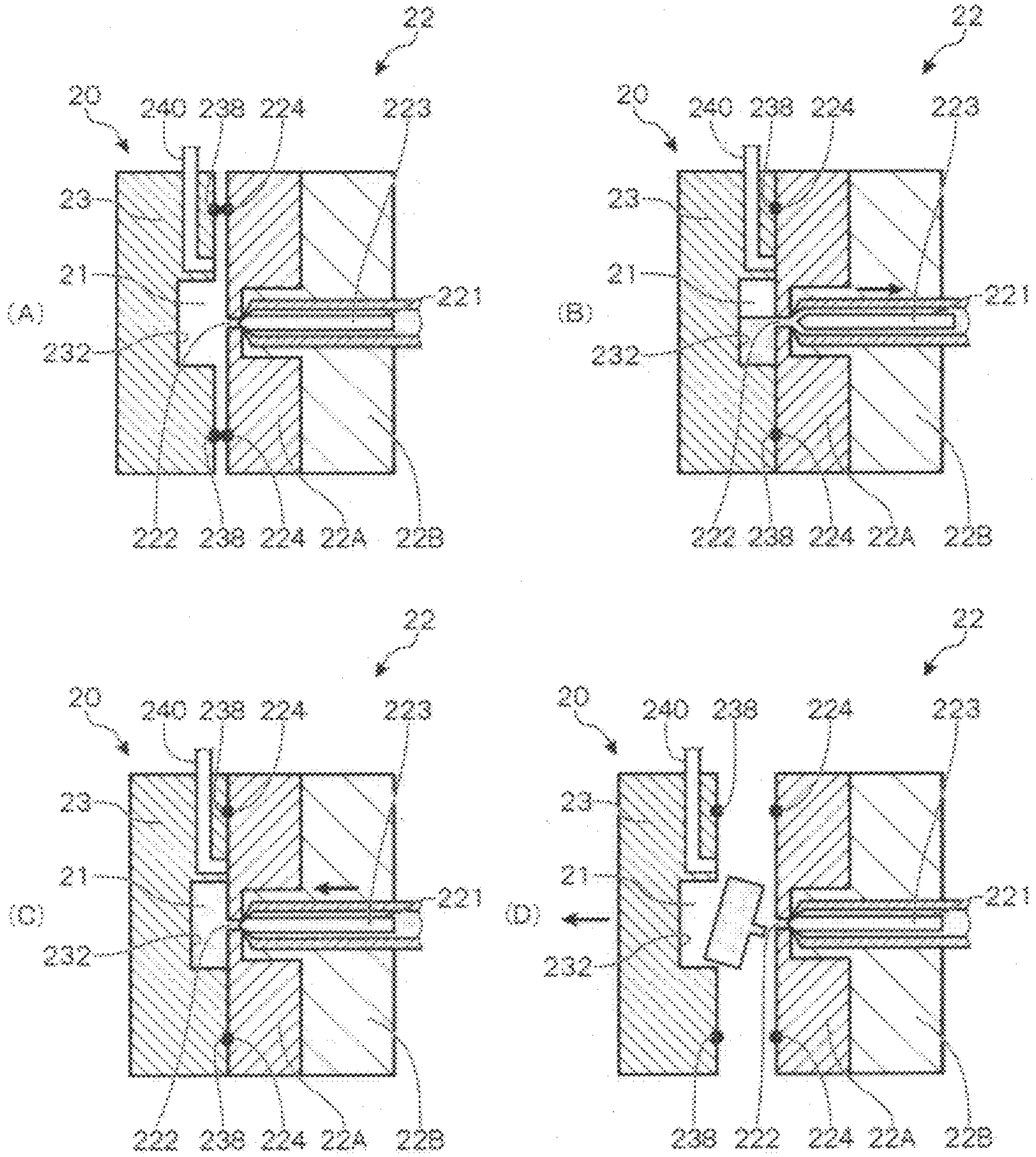
FIG. 2 is a schematic cross-sectional view of a mold that can be used in the method for producing a molded article of the invention.

When implementing the method of the invention using the device shown in FIG. 2, for example, the needle 223 and the opening 222 correspond to the gate system described above. As described above, the needle 223 moves toward the movable mold 23 to close the opening 222, so that the introduction path 221 is divided at the front side of the heating unit 22A, the thermosetting composition for injection molding introduced into the introduction path 221 remains in the cooling unit 22B, and the flow and heat transfer of the thermosetting composition for injection molding can be blocked. As a system capable of blocking the flow and heat transfer of the thermosetting composition for injection molding, a valve gate system, a shut off nozzle system, and the like can be used.

The heating device is a device that heats the heating unit 22A and the movable mold 23. The temperature in the cavity (also referred to as "cavity temperature") can be set to a predetermined temperature by these heating devices. In the method of the invention, the temperature of the mold 232 constituting the cavity portion is preferably set to 40° C. or higher and 150° C. or lower.

The cooling device cools the flow path of the thermosetting composition for injection molding. Specifically, it is preferable to cool the filling device 10 and the cooling portion 22B of the mold 20 at a temperature of 10° C. or higher and 50° C. or lower.

In the case of injection molding, the needle in FIG. 1 (not shown) and the needle 223 in FIG. 2, and the flow path in FIG. 1 (not shown) and the introduction path 221 in FIG. 2 correspond to each other, respectively.

The supplying step is shown in FIG. 1.

In the case of transfer molding or compression molding, the amount of the material can be measured by inserting an appropriate amount of the material into the plunger 11 using a supply device (not shown) such as a syringe.

In the case of injection molding, the thermosetting composition for injection molding is injected into a filling device 10 shown in FIG. 1 through an inlet (not shown). The injected thermosetting composition for injection molding is extruded into the backflow prevention valve 12, and then a predetermined amount thereof is measured by the plunger 11. After weighing or before injection, the backflow prevention valve 12 moves forward and functions as a backflow prevention valve at the time when the plunger 11 is operated. During this time, the flow path is cooled by the cooling device, so that the thermosetting composition for injection molding flows smoothly without being cured.

The filling step is shown in FIG. 2(B), for example.

At the time of injecting the thermosetting composition for injection molding into the cavity, it is preferable that the inside of the cavity is depressurized by installing a vent that releases the air in the cavity, or by providing pores connected to a depressurization device such as the depressurization tube 240 in FIG. 2 to allow the inside of the cavity to be depressurized. It is for the reason that in the process of injecting the thermosetting composition for injection molding into the cavity and completely filling the cavity, the vent is to allow the air in the cavity to escape, and the depressurization in the cavity is to make the cavity to be free of air so that the cavity can be completely filled with the thermosetting composition for injection molding. In the case of absence of this mechanism, it is preferable to have a mechanism that allows the air in the cavity to escape. (e.g., a vent mechanism).

From the viewpoint of preventing the curing defect, the gauge pressure in the cavity at the time of injecting the thermosetting composition for injection molding into the cavity is −90 kPa or lower (vacuum pressure 10 kPa), the oxygen amount in the cavity is 0.2×cavity volume/22.4 mol or smaller, or −90 kPa or lower (vacuum pressure 10 kPa), and the oxygen amount in the cavity is preferably 0.2×cavity volume/22.4 mol or smaller.

As the method of setting the oxygen amount in the cavity to 0.2×cavity volume/22.4 mol or smaller, degassing by a depressurization device connected to the pores for degassing the cavity of the mold, and displacing with inert gas by an inert gas displacing device connected to the pores for displacing the cavity of the mold with an inert gas are preferable.

The method of reducing pressure in the cavity is preferably sprueless.

In order to mold the thermosetting composition for injection molding, first, the movable mold 23 is brought close to the fixed mold 22, and the molds are clamped (FIG. 2(A). The movement of the movable mold 23 is once stopped at a position where the elastic member 238 of the movable mold 23 abuts against the elastic member 224 of the fixed mold 22.

The thermosetting composition for injection molding is preferably filled into the cavity by opening the gate of the gate system (moving the needle 223 toward the fixed mold 22) and filling into the cavity 21 of the mold with the thermosetting composition for injection molding. The movable mold 23 and the heating unit 22A provided in the fixed mold 22 are constantly heated, and are the cavity temperature is set, for example, at a temperature of 50° C. or higher, preferably 50° C. or higher and 150° C. or lower, particularly preferably 50° C. or higher and 120° C. or lower.

In the case of using an injection molding machine, when injection from the injection portion into the cavity is started, a nozzle of a shut-off nozzle (a valve gate in some cases) is opened, a plunger of the injection portion is moved, and a thermosetting component is injected into the cavity. In the case of using a transfer molding machine, it is sufficient if the material can flow into the cavity, so that it is not necessary to block the transfer of heat because all the material presented in from inside of the plunger to the cavity are cured.

The curing step is shown in FIG. 2(C), for example.

At the same time of completion of filling with the thermosetting composition for injection molding into the cavity 21, curing of the thermosetting composition for injection molding is started. In order to improve the transferability of the molded article, curing is preferably performed by applying a predetermined pressure. That is, the plunger 11 is preferably pressurized to a 1.0 MPa or higher and 30 MPa or lower. In order to improve transferability, this pressure applied to the thermosetting composition for injection molding is referred to as pressure keeping.

In the curing step, pressure keeping (increasing the pressure applied to the thermosetting composition for injection molding) is preferably performed after the start of the heat-curing and before the completion of the curing, and after the pressure keeping, the gate of the gate system is closed to perform the heat-curing. Specifically, in order to close the gate, the needle 223 is moved forward to close the opening 222. In the molding process, the cooling device is operated to cool the entire flow path of the thermosetting composition for injection molding, that is, the filling device 10 of the molding machine and the cooling portion 22B provided in the fixed mold 22 of the mold 20. At this time, the temperature of the entire flow path is preferably maintained at a temperature of 10° C. or higher and 50° C. or lower, and particularly preferably set at a temperature of 30° C. or lower.

Figure 3:
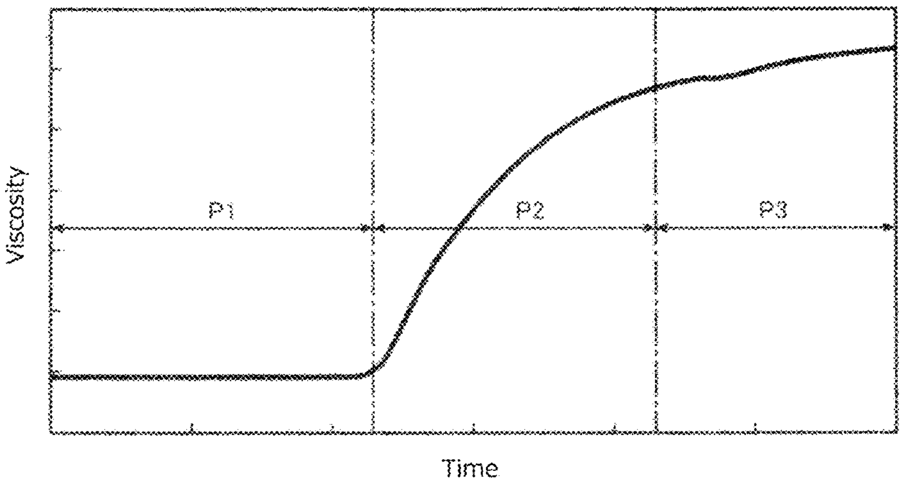
FIG. 3 is a diagram showing a relationship between the viscosity and the time of a thermosetting composition for injection molding in one embodiment of the method for producing a molded article of the invention.

The pressure keeping in the plunger 11 and the timing of the start of the pressure keeping will be described below. FIG. 3 is a diagram showing a relationship between viscosity and time of the thermosetting composition for injection molding according to this embodiment. In FIG. 3, the period P1 of from injection of the material into the cavity to completion of the filling corresponds to the induction period until the material is heated and curing starts. The curing step is divided into two stages: i.e. the early stage of curing P2 from when the material begins to cure with heat until completion of curing, and the late stage of curing P3 in which curing is complete. The viscosity of the thermosetting composition for injection molding does not change and remains low during the induction period P1, a remarkable viscosity change from low viscosity to high viscosity occurs during the early stage of curing P2, and the viscosity gradually increases while keeping high viscosity state during the late stage of curing P3.

In the early stage of curing P2, the thermosetting composition for injection molding shrinks due to not only a change in viscosity from liquid to solid but also a change in volume. Therefore, in actual molding, when no pressure is applied to the thermosetting composition for injection molding, the molded article will be inferior in transferability. In order to improve transferability, it is preferred that a pressure is applied to the thermosetting composition for injection molding (pressure keeping), the thermosetting composition for injection molding is brought into closely contact with the mold 20, and the thermosetting composition for injection molding is replenished from the gate portion.

However, when a pressure is applied to the thermosetting composition for injection molding of this embodiment in a low viscosity state, there is a possibility that a defective phenomenon in which the material leaks out from a gap between the fixed mold 22 and the movable mold 23 and hardens (burrs), and a defective operation of the extrusion pin due to penetration of the thermosetting composition for injection molding into a gap around the extrusion pin, and the like occur. On the other hand, even when a pressure is applied in a state where the viscosity is increased at the early stage of curing P2 or in a state at the late stage of curing P3, the thermosetting composition for injection molding is highly viscous, so that the thermosetting composition cannot be compressively deformed and the transferability cannot be improved. Therefore, in order to obtain a highly transferable molded article, it is preferable to adjust the timing of the start of the pressure keeping (the pressure keeping starting time T) to the timing of shifting from the induction period P1 to the early stage of curing P2 in the curing step.

If the viscosity of the thermosetting composition for injection molding in the cavity 21 can be detected, the pressure keeping starting time T can be determined.

Since the thermosetting composition for injection molding in this embodiment starts to shrink at the same time as the viscosity thereof increase in the early stage of curing P2, it is preferable to detect the time when the thermosetting composition starts to shrink. Thus, the pressure keeping starting time T can be appropriately determined.

In the curing step, by pressure keeping under the above described conditions, it is possible to prevent sink marks and strain of the molded article and to improve transferability.

After completion of the pressure keeping for a certain period of time, the needle 223 is moved forward to close the opening 222 as shown in FIG. 2(C), and the thermosetting composition for injection molding is completely cured by heating for a certain period of time so as not to generate an uncured portion.

Here, the plunger 11 is moved forward to fill the cavity 21 of the mold 20 with the thermosetting composition for injection molding, and the time required for filling is defined as $t_1$. When the filling is completed, the plunger 11 is stopped. Further, when curing of the thermosetting composition for injection molding is started, shrinkage of the thermosetting composition for injection molding occurs at the same time, and therefore, the plunger 11 stopped after the completion of the filling step starts to move forward again. The time required from the completion of the filling step until the plunger 11 starts to move forward again due to the shrinkage is defined as $t_2$. Further, when the time required to completely cure the thermosetting composition for injection molding with heat is defined as $t_3$, $t_1+t_2+t_3$ (total time required for the filling step and the thermosetting step) is preferably 0.2 minutes to 3 minutes. More preferably, $t_1+t_2+t_3$ is 0.2 minutes to 2 minutes. In the case where $t_1+t_2+t_3$ is 0.2 minutes or shorter, curing may be incomplete, and in the case where $t_1+t_2+t_3$ is 3 minutes or longer, it is not preferable from the viewpoint of mass productivity.

The releasing step is shown in FIG. 2(D), for example.

By separating the movable mold 23 from the fixed mold 22, the cured product in the cavity can be taken out. If the releasability is poor, an ejector mechanism may be provided in the mold as appropriate.

The cured product of the invention can be produced using the above described thermosetting composition for injection molding.

The cured product of the invention is preferably a molded article.

The cured product of the invention is preferably soft from the viewpoints of preventing breakage of the sealing material, preventing occurrence of cracks, and absorbing impact of vibration due to deformation of the substrate. In the cured product of the invention, the hardness is preferably low, and is preferably 20 to 80, and more preferably 20 to 70, in the hardness on the type-A durometer in accordance with JIS K7215.

The cured product of the invention can be suitably used, for example, for sealing an electronic circuit device, sealing an electronic circuit board, and the like. The electronic circuit device and the electronic circuit board using the cured product of the invention are excellent in waterproofness, water vapor barrier properties, and heat resistance.

EXAMPLES

Hereinafter, Examples of the invention will be described in more detail, but the invention is not limited to these Examples.

Examples 1 to 20 and Comparative Examples 1 to 11

(Preparation of Thermosetting Composition for Injection Molding)

A component (A), a component (A), a component (B), a component (C), and a component (D) were blended in the blending amounts shown in Tables 1 and 2 to prepare each thermosetting composition for injection molding. In Tables 1 and 2, the blending amounts of the component (A) (or component (A'), the component (C), and the component (D) are respectively represented as a blending amount (% by mass) of the component (A) (or component (A'), the component (C), and the component (D), respectively, based on a total blending amount of 100% by mass of the component (A) (or component (A'), the component (C), and the component (D).

In Tables 1 and 2, the blending amount of the component (B) is represented as parts by mass, based on 100 parts by mass of a total blending amount of the component (A) (or component (A'), the component (C), and the component (D).

Specifically, in preparation of the thermosetting composition for injection molding, first, the component (A) (or component (A'), the component (C), and the component (D) were weighed, mixed, and stirred. Next, the component (B) was weighed and added to the mixture, and finally the mixture was stirred to obtain a thermosetting composition for injection molding.

As the stirring device, a stirring device capable of stirring by rotation and revolution was used. The number of revolutions was 1000 rpm for rotation and 2000 rpm for revolution. The time of rotation was set for 1 minute.

As the component (A), the following was used.

A1: CN2283 (polyester diacrylate, manufactured by Arkema S.A.; polymer having the two structural units represented by the following formulas)

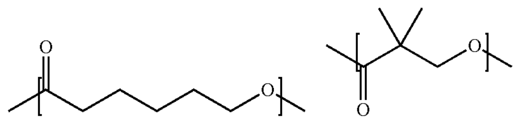

As the component (A'), the followings were used.

A'1: KE-200 (manufactured by Shi n-Etsu Chemical Co., Ltd., silicone material)

A'2: KE-1282-A/B (manufactured by Shin-Etsu Chemical Co., Ltd., silicone material)

A'3: KE-1012-A/B (manufactured by Shin-Etsu Chemical Co., Ltd., silicone material)

A'4: SU-2180A/B (manufactured by Sanyu Rec Co., Ltd., urethane material)

A'5: UF-705A/B (manufactured by Sanyu Rec Co., Ltd., urethane material)

A'6: SU-3900A/B (manufactured by Sanyu Rec Co., Ltd., urethane material)

A'7: LIGHT ACRYLATE PBD-A (manufactured by KYOEISHA CHEMICAL Co., LTD., polybutadiene acrylate material)

As the component (C), The followings were used.

C1: BPE-80N (manufactured by Shin-Nakamura Chemical Co., Ltd., compound represented by the following formula, and the average value of e+f is 2.3)

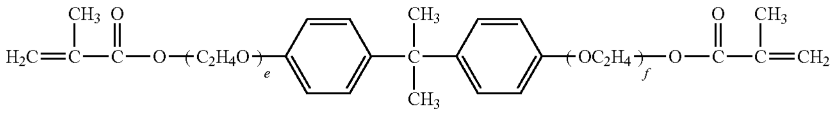

e + f = 2.3

C2: SR-349 (manufactured by Arkema S.A., compound represented by the following formula)

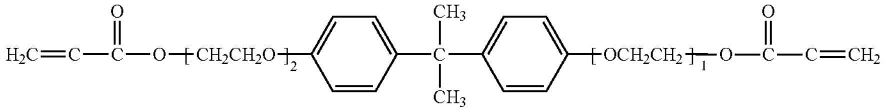

C3: EPOXYESTER 3000MK (manufactured by KYOEISHA CHEMICAL Co., LTD., compound represented by the following formula)

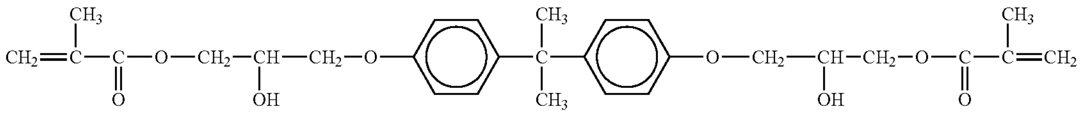

C4: EPOXYESTER 3002MK (manufactured by KYOEISHA CHEMICAL Co., LTD., compound represented by the following formula)

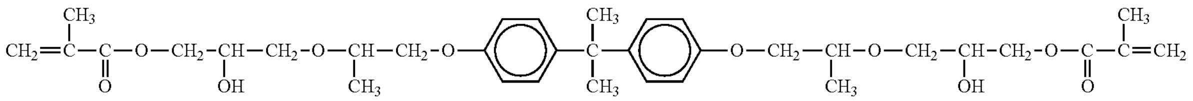

C5: LA3320 (manufactured by KURARAY CO., LTD., methyl methacrylate-n-butyl acrylate block copolymer, proportion of n-butyl acrylate structural unit based on a total amount of the structural units is 80 mol %, Mw. 130,000, Mn: 100,000, Mw/Mn: 1.3)

C6: KL-LK9333 (manufactured by KURARAY CO., LTD., methyl methacrylate-n-butyl acrylate/2-ethylhexyl acrylate block copolymer, proportion of total of n-butyl acrylate structural unit and 2-ethylhexyl acrylate is 80 mol % based on a total of the structural units, Mw. 80,000, Mn: 65,000, Mw/Mn: 1.2)

C7: LA2330 (manufactured by KURARAY CO., LTD., methyl methacrylate-n-butyl acrylate block copolymer, proportion of n-butyl acrylate structural unit is 80 mol % based on a total of the structural units, Mw. 85,000, Mn: 105,000, Mw/Mn: 1.2)

C8: LA2114 (manufactured by KURARAY CO., LTD., methyl methacrylate-n-butyl acrylate block copolymer, proportion of n-butyl acrylate structural unit is 90 mol % based on a total of the structural units, Mw. 50,000, Mn: 48,000, Mw/Mn: 1.1)

For the average value of e+f of BPE-80N, the intensity of 1H in the terminal groups $CH_2$═, and the total intensity of $^1H$ in $(C_2H_4O)_e$ groups and $(OC_2H_4)_f$ groups were measured by 1H-NMR under the conditions below. The average value of e+f was calculated by dividing the value of (the total intensity of $^1H$ in $(C_2H_4O)_e$ groups and $(OC_2H_4)_f$ groups)/4 by the value of (the intensity of $^1H$ of the terminal groups $CH_2$═)/4.

Measuring instrument: RESONANCE (manufactured by JEOL Ltd.)

Magnetic field strength: 500 MHz

Reference substance: TMS (tetramethylsilane)

Solvent: Deuterated chloroform

As the component (D), the followings were used.

D1: $SR_{423}$ (manufactured by Alkema S.A., isobornyl methacrylate)

D2: A-DOD-N (manufactured by Shin-Nakamura Chemical Co., Ltd., 1,10-decanediol diacrylate)

D3: LIGHT ESTER L (manufactured by KYOEISHA CHEMICAL Co., LTD., 1-lauryl methacrylate)

D4: BLEMMER GH (manufactured by NOF CORPORATION, glycidyl methacrylate)

As the component (B), the followings were used.

B1: PEROYL TCP (manufactured by NOF CORPORATION, compound represented by the following formula)

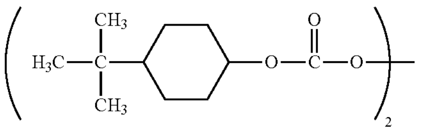

B2: PEROYLL (manufactured by NOF CORPORATION, compound represented by the following formula)

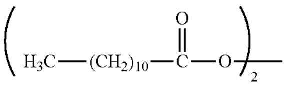

B3: PERHEXA HC (manufactured by NOF CORPORATION, compound represented by the following formula)

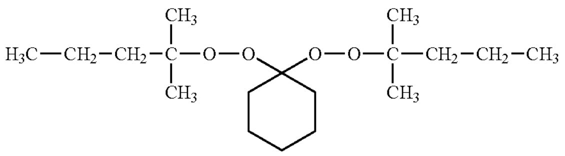 [SMILES: CCCC(C)(C)OOC1(OOC(C)(C)CCC)CCCCC1]

B4: LUPEROX 331 (manufactured by ARKEMA Yoshitomi, Ltd., compound represented by the following formula)

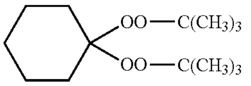

(Viscosity Measurement of Thermosetting Composition for Injection Molding)

In accordance with JIS K7117-2, the viscosity of the obtained thermosetting composition for injection molding was measured using a viscoelasticity measuring device Physica MCR301 (manufactured by Anton Paar GmbH) in a shear rate of 10 $s^{-1}$ under the conditions below.

The results are shown in Tables 1 and 2.

Measurement method: Cylindrical rotational viscosity measurement method

Temperature: 25° C.

Shear rate region: 10 $s^{-1}$ (Production of Molded Article 1)

The above-described thermosetting composition for injection molding was subjected to LIM (Liquid Injection Molding) under the conditions below to obtain a molded article (cured product) 1.

For molding, a mold having a cavity size of 10 mm in width, 50 mm in length and 1 mm in thickness, and having a vent portion of 5 mm in width, 10 mm in length and 0.03 mm in thickness at the flow end portion was used.

LIM was carried out under the following conditions.

Molding machine: liquid thermosetting resin injection molding machine LA-40S (manufactured by Sodick Co., Ltd.)

Weighing by the plunger of the molding machine: 1.1 g

Temperature of the flow path of the low-temperature section: 15° C.

Flow path and method of heat-blocking: shut-off nozzle was used

Temperatures of the cavity and the high-temperature section of the flow path: temperature shown in Tables 1 and 2

Applied pressure at the time of filling: 10 MPa or lower

Pressure keeping time: 15 seconds

Applied pressure during pressure keeping: 15 MPa

Curing time: time shown in Tables 1 and 2

(Evaluation of Fluid Leakage at Flow Path)

In the filling of the thermosetting composition for injection molding at the time of producing the molded article 1 described above, the presence or absence of liquid leakage at a portion where the injection nozzle and the mold of the molding machine come into contact with each other (sprue bush) and the mold parting surface was visually checked. The case where no liquid leakage occurred was shown as "None." The case where liquid leakage occurred was shown as "Yes."

(Evaluation of Moldability)

For the curing time at the time of production of the molded article 1 described above, the case where cured in shorter than 3 minutes was shown as O, the case where cured in 3 minutes or longer and shorter than 60 minutes was shown as Δ, the case where cured in 60 minutes or longer and shorter than 120 minutes was shown as X, and the case where cured in 120 minutes or longer was shown as XX.

(Evaluation of Filling Property)

In the filling of the thermosetting composition for injection molding at the time of producing the molded article 1 described above, the filling property was visually confirmed. The case where no void is occurred and no unfilled portion was occurred is shown as O. The case where a void or an unfilled portion was occurred is shown as Δ. The case where a void was occurred and an unfilled portion was occurred was shown as X.

(Measurement of Hardness)

For the above-described molded article 1, the hardness (without unit) on the type A durometer was measured using a Asker P2-A-tape (manufactured by KOBUNSHI KEIKI CO., LTD.) in accordance with JIS K7215.

The results are shown in Tables 1 and 2.

(Production of Molded Article 2)

Molded articles were produced in the same manner as in the production of the molded article 1 except that the below-mentioned mold was used. The obtained molded article was referred to as a molded article 2.

As the mold, one having a cavity size of 50 mm in vertical, 50 mm in horizontal, and 2 mm in thickness was used.

(Evaluation of Water Vapor Permeability)

The water vapor permeability of the above-described molded article 2 was evaluated according to the method B of JIS K7129. The case where the obtained value was 30 g/($m^2$·1 day) or less was shown as O. The case where the obtained value was more than 30 g/($m^2$·1 day) was shown as X.

The results are shown in Tables 1 and 2.

(Evaluation of Heat Resistance)

The molded article 2 was left in an oven, and the heat resistance was evaluated based on the degree of coloration. Specifically, the molded article 2 described above was stored in an oven at 100° C. for 7 days, and then the Yellow Index (YI) value of the molded article was measured. The case where difference in YI values of the molded article 2 before and after the storage in the oven was 15 or smaller was defined as O, and the case where the difference was greater than 15 was defined as X. YI was measured in accordance with JIS Z 8722. SZ optical SENSOR (manufactured by Nippon Denshoku Industries Co., Ltd.) was used as an apparatus for measuring YI values.

TABLE 1

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Component (A) | A1 | 100 | 80 | 70 | 70 | 90 | 70 | 70 | 40 | 70 | 60 | 35 |
| Component (A') | A'1 | — | — | — | — | — | — | — | — | — | — | — |
| | A'2 | — | — | — | — | — | — | — | — | — | — | — |
| | A'3 | — | — | — | — | — | — | — | — | — | — | — |
| | A'4 | — | — | — | — | — | — | — | — | — | — | — |
| | A'5 | — | — | — | — | — | — | — | — | — | — | — |
| | A'6 | — | — | — | — | — | — | — | — | — | — | — |
| | A'7 | — | — | — | — | — | — | — | — | — | — | — |
| Component (B) | B1 | — | 1 | — | — | 1 | — | 1 | — | — | 1 | — |
| | B2 | 1 | — | — | 0.8 | — | — | — | 0.8 | — | — | — |
| | B3 | — | — | 1 | — | — | — | — | — | 1 | — | 1 |
| | B4 | — | — | — | — | — | 1 | — | — | — | — | — |
| Component (C) | C1 | — | — | — | — | — | — | — | — | — | — | 40 |
| | C2 | — | — | — | — | — | — | — | — | — | — | — |
| | C3 | — | — | — | — | — | — | — | — | — | — | — |
| | C4 | — | — | — | — | — | — | — | — | — | — | — |
| | C5 | — | — | — | — | — | — | — | — | — | — | — |
| | C6 | — | — | — | — | — | — | — | — | — | — | — |
| | C7 | — | — | — | — | — | — | — | — | — | — | — |
| | C8 | — | — | — | — | — | — | — | — | — | — | — |
| Component (D) | D1 | — | 20 | 30 | 30 | — | — | 20 | — | — | — | 5 |
| | D2 | — | — | | — | — | — | — | 20 | 20 | 10 | — |
| | D3 | — | — | — | — | 10 | 30 | 10 | 20 | — | 20 | 20 |
| | D4 | — | — | — | — | — | — | — | 20 | 10 | 10 | — |
| Curing time (min) | | 2 | 2 | 2 | 2 | 2 | 2 | 2 | 2 | 2 | 2 | 2 |
| Viscosity of thermosetting composition (Pa · s) | 10 $s^{-1}$ | 0.10 | 0.06 | 0.04 | 0.04 | 0.07 | 0.03 | 0.04 | 0.02 | 0.04 | 0.03 | 0.08 |
| Fluid leakage at flow path | | None | Yes | Yes | Yes | Yes | Yes | Yes | Yes | Yes | Yes | None |
| Temperatures of cavity and high-temperature section of flow path (° C.) | | 120 | 90 | 90 | 120 | 90 | 90 | 90 | 120 | 120 | 90 | 130 |
| Moldability | | ○ | ○ | ○ | ○ | ○ | ○ | ○ | ○ | ○ | ○ | ○ |
| Filling propety | | ○ | ○ | ○ | ○ | ○ | ○ | ○ | ○ | ○ | ○ | ○ |
| Hardness | | 30 | 50 | 70 | 70 | 25 | 20 | 40 | 35 | 55 | 50 | 65 |
| Water vapor permeability | | ○ | ○ | ○ | ○ | ○ | ○ | ○ | ○ | ○ | ○ | ○ |
| Heat resistance | | ○ | ○ | ○ | ○ | ○ | ○ | ○ | ○ | ○ | ○ | ○ |

| | | Example | | | | | | | | |
|---|---|---|---|---|---|---|---|---|---|---|
| | | 12 | 13 | 14 | 15 | 16 | 17 | 18 | 19 | 20 |
| Component (A) | A1 | 40 | 50 | 60 | 55 | 65 | 55 | 60 | 65 | 50 |
| Component (A') | A'1 | — | — | — | — | — | — | — | — | — |
| | A'2 | — | — | — | — | — | — | — | — | — |
| | A'3 | — | — | — | — | — | — | — | — | — |
| | A'4 | — | — | — | — | — | — | — | — | — |
| | A'5 | — | — | — | — | — | — | — | — | — |
| | A'6 | — | — | — | — | — | — | — | — | — |
| | A'7 | — | — | — | — | — | — | — | — | — |
| Component (B) | B1 | — | — | — | — | — | — | — | — | — |
| | B2 | 1 | 1 | 1 | 1 | — | 1 | 1 | — | 1 |
| | B3 | — | — | — | — | 1 | — | — | — | — |
| | B4 | — | — | — | — | — | — | — | 1 | — |
| Component (C) | C1 | — | — | — | — | — | — | — | — | — |
| | C2 | 40 | — | — | — | — | — | — | — | — |
| | C3 | — | 30 | — | 20 | — | — | — | — | — |
| | C4 | — | — | 20 | — | — | — | — | — | — |
| | C5 | — | — | — | — | 10 | — | — | — | — |
| | C6 | — | — | — | — | — | 10 | — | — | — |
| | C7 | — | — | — | — | — | — | 20 | — | — |
| | C8 | — | — | — | — | — | — | — | 15 | 20 |

TABLE 1-continued

| | | | | | | | | | | |
|---|---|---|---|---|---|---|---|---|---|---|
| Component (D) | D1 | — | — | — | — | — | 15 | — | — | — |
| | D2 | — | — | — | 10 | — | — | — | — | 10 |
| | D3 | 20 | 20 | 20 | 10 | 20 | 20 | 20 | 20 | 20 |
| | D4 | — | — | — | 5 | 5 | — | — | — | — |
| Curing time (min) | | 2 | 2 | 2 | 2 | 2 | 2 | 2 | 2 | 2 |
| Viscosity of thermosetting composition (Pa · s) | 10 $s^{-1}$ | 0.09 | 0.20 | 0.09 | 0.10 | 0.49 | 0.40 | 6.70 | 0.47 | 0.71 |
| Fluid leakage at flow path | | None | None | None | None | None | None | None | None | None |
| Temperatures of cavity and high-temperature section of flow path (° C.) | | 120 | 120 | 120 | 120 | 130 | 120 | 120 | 140 | 120 |
| Moldability | | ○ | ○ | ○ | ○ | ○ | ○ | ○ | ○ | ○ |
| Filling propety | | ○ | ○ | ○ | ○ | ○ | ○ | ○ | ○ | ○ |
| Hardness | | 60 | 40 | 30 | 35 | 30 | 40 | 20 | 25 | 20 |
| Water vapor permeability | | ○ | ○ | ○ | ○ | ○ | ○ | ○ | ○ | ○ |
| Heat resistance | | ○ | ○ | ○ | ○ | — | — | — | — | — |

TABLE 2

| | | Comparative Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Component (A) | A1 | — | — | — | — | — | — | — | 100 | 70 | 60 | 60 |
| Component (A') | A'1 | 100 | — | — | — | — | — | — | — | — | — | — |
| | A'2 | — | 100 | — | — | — | — | — | — | — | — | — |
| | A'3 | — | — | 100 | — | — | — | — | — | — | — | — |
| | A'4 | — | — | — | 100 | — | — | — | — | — | — | — |
| | A'5 | — | — | — | — | 100 | — | — | — | — | — | — |
| | A'6 | — | — | — | — | — | 100 | — | — | — | — | — |
| | A'7 | — | — | — | — | — | — | 100 | — | — | — | — |
| Component (B) | B1 | — | — | — | — | — | — | 1 | — | — | — | — |
| | B2 | — | — | — | — | — | — | — | — | — | — | — |
| | B3 | — | — | — | — | — | — | — | — | — | — | — |
| | B4 | — | — | — | — | — | — | — | — | — | — | — |
| Component (C) | C1 | — | — | — | — | — | — | — | — | — | — | — |
| | C2 | — | — | — | — | — | — | — | — | — | — | — |
| | C3 | — | — | — | — | — | — | — | — | — | 20 | — |
| | C4 | — | — | — | — | — | — | — | — | — | — | — |
| | C5 | — | — | — | — | — | — | — | — | — | — | — |
| | C6 | — | — | — | — | — | — | — | — | — | — | — |
| | C7 | — | — | — | — | — | — | — | — | — | — | 20 |
| | C8 | — | — | — | — | — | — | — | — | — | — | — |
| Component (D) | D1 | — | — | — | — | — | — | — | — | 30 | — | — |
| | D2 | — | — | — | — | — | — | — | — | — | — | — |
| | D3 | — | — | — | — | — | — | — | — | — | 20 | 20 |
| | D4 | — | — | — | — | — | — | — | — | — | — | — |
| Curing time (min) | | 4210 | 120 | 30 | 60 | 180 | 120 | 2 | 120 | 180 | 120 | 120 |
| Viscosity of thermosetting composition (Pa · s) | 10 $s^{-1}$ | 2.80 | 2.10 | 0.90 | 1.10 | 2.40 | 6.40 | 4.50 | 0.10 | 0.04 | 0.15 | 2.99 |
| Fluid leakage at flow path | | Yes | Yes | Yes | Yes | Yes | Yes | None | None | Yes | None | None |
| Temperatures of cavity and high-temperature section of flow path (° C.) | | 50 | 90 | 110 | 80 | 80 | 80 | 90 | 160 | 150 | 160 | 160 |
| Moldability | | xx | xx | Δ | x | xx | xx | ○ | xx | xx | xx | xx |
| Filling propety | | x | ○ | ○ | ○ | ○ | ○ | ○ | x | x | x | x |
| Hardness | | 25 | 10 | — | 50 | 40 | 70 | 50 | 30 | 30 | 20 | 15 |
| Water vapor permeability | | x | x | x | ○ | ○ | ○ | ○ | x | x | x | x |
| Heat resistance | | ○ | ○ | ○ | ○ | ○ | ○ | x | x | x | x | x |

The thermosetting compositions for injection molding of Examples 1 to 20 were excellent in filling properties and cured in a short time, and the molded articles excellent in water vapor permeability and heat resistance were obtained.

On the other hand, the thermosetting compositions for injection molding of Comparative Examples 2 to 6 took longer time to cure than those of Examples 1 to 20. In addition, the thermosetting compositions for injection molding of Comparative Examples 1 and 8 to 11 had poor filling properties, so that a longer time to cure was required. Furthermore, the molded articles of Comparative Examples 1 to 3 and 8 to 11 had poor water vapor permeability. The molded articles of Comparative Examples 7 to 11 had poor heat resistance.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The invention claimed is:

1. A method for producing a molded article comprising:

supplying a thermosetting composition for injection molding into a plunger, the thermosetting composition for injection molding comprises:

(A) a di(meth)acrylate compound having a structural unit represented by the following formula (A1), and (B) a thermal polymerization initiator:

(A1)

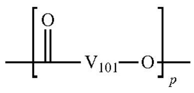

wherein in the formula (A1), $V_{101}$ is a substituted or unsubstituted divalent aromatic hydrocarbon group including 6 to 12 ring carbon atoms, a substituted or unsubstituted divalent alicyclic hydrocarbon group including 5 to 12 ring carbon atoms, or a substituted or unsubstituted divalent aliphatic hydrocarbon group including 2 to 30 carbon atoms;

p represents the average number of structural units; and when p is 2 or more, two or more $V_{101}$'s may be the same as or different from each other;

filling the thermosetting composition for injection molding supplied into the plunger into a cavity of a mold using the plunger, the cavity being set to be a gauge pressure of −90 kPa or lower (vacuum pressure 10 kPa) and an oxygen amount of 0.2×cavity volume/22.4 mol or smaller, or to be a gauge pressure of −90 kPa or lower (vacuum pressure 10 kPa) and an oxygen amount of 0.2× cavity volume/22.4 mol or smaller, and thermosetting the thermosetting composition for injection molding filled into the cavity.

2. The method for producing a molded article according to claim 1, wherein a temperature of a part of the mold constituting the cavity is 40 to 150° C.

3. The method for producing a molded article according to claim 1, wherein the filling is performed through a flow path between the plunger and the cavity, the flow path being controlled in a temperature at 50° C. or lower.

4. The method for producing a molded article according to claim 3, wherein the flow path has a gate system that blocks flow of the thermosetting composition for injection molding and heat transfer.

5. The method for producing a molded article according to claim 4, wherein the filling is performed by opening a gate of the gate system, and in the step of thermosetting, a pressure holding is performed, and after the pressure holding, the gate of the gate system is closed to complete the thermosetting.

6. The method for producing a molded article according to claim 1, wherein the step of filling and the step of thermosetting are performed in 0.2 to 3 minutes.

* * * * *